United States Patent
Chu

(10) Patent No.: US 12,531,064 B1
(45) Date of Patent: Jan. 20, 2026

(54) AUDIO-BASED USER ENGAGEMENT DETECTION

(71) Applicant: Amazon Technologies, Inc., Seattle, WA (US)

(72) Inventor: Wai Chung Chu, San Jose, CA (US)

(73) Assignee: Amazon Technologies, Inc., Seattle, WA (US)

(*) Notice: Subject to any disclaimer, the term of this patent is extended or adjusted under 35 U.S.C. 154(b) by 134 days.

(21) Appl. No.: 18/620,703

(22) Filed: Mar. 28, 2024

(51) Int. Cl.
  *G10L 15/22* (2006.01)
  *G10L 25/21* (2013.01)
  *H04R 3/00* (2006.01)

(52) U.S. Cl.
  CPC .............. *G10L 15/22* (2013.01); *G10L 25/21* (2013.01); *H04R 3/005* (2013.01)

(58) Field of Classification Search
  CPC ......... G10L 25/51; G10L 15/16; G10L 15/22; G10L 25/21; G10L 2015/088; G10L 15/20; G10L 25/18; G10L 25/06; G10L 21/0308; G10L 25/78; G06N 3/08; H04R 1/1083; H04R 3/005; H04R 2410/05; H04R 1/1008; H04R 1/406; H04R 2410/01; G10K 11/178; G10K 2210/3028; G10K 11/175; G10K 2210/3011; G10K 2210/30231
  See application file for complete search history.

(56) References Cited

U.S. PATENT DOCUMENTS

| | | | | |
|---|---|---|---|---|
| 5,485,524 A | * | 1/1996 | Kuusama | G10L 21/0208 704/226 |
| 7,197,456 B2 | * | 3/2007 | Haverinen | G10L 15/20 704/226 |
| 8,213,598 B2 | * | 7/2012 | Bendersky | H04B 3/23 379/406.13 |
| 8,271,279 B2 | * | 9/2012 | Hetherington | G10L 21/0216 704/211 |
| 8,750,491 B2 | * | 6/2014 | Prakash | H04M 9/082 379/406.05 |

(Continued)

OTHER PUBLICATIONS

Amit Chhetri, et al. "Multichannel Audio Front-end for Far-field Automatice Speech Recognition," 26th European Signal Processing Conference (EUSIPCO), 2018, 5 pages. https://www.eurasip.org/Proceedings/Eusipco/Eusipco2018/papers/1570431613.pdf.

(Continued)

*Primary Examiner* — Mohammad K Islam
(74) *Attorney, Agent, or Firm* — Pierce Atwood LLP

(57) ABSTRACT

A system can operate a speech-controlled device to perform user engagement detection (UED) processing to detect when speech represented in audio data is directed to the device. For example, the device may extract audio features from the audio data and process these audio features using a classifier to estimate an orientation of the user's head, which may be used as a proxy for user engagement. Thus, if the head orientation is within an engagement zone (which varies based on distance to the user), the device may determine that the user is engaged with the device and perform language processing on input speech. In contrast, if the head orientation is outside of the engagement zone, the device may determine that the user is not engaged and ignore the input speech. To enable additional functionality, the classifier may optionally output a coarse estimate of the head orientation along with the UED determination.

20 Claims, 14 Drawing Sheets

(56) References Cited

U.S. PATENT DOCUMENTS

| | | | | |
|---|---|---|---|---|
| 8,798,992 | B2* | 8/2014 | Gay | G10L 21/028 |
| | | | | 704/226 |
| 8,914,282 | B2* | 12/2014 | Konchitsky | G10L 21/0208 |
| | | | | 704/226 |
| 9,043,203 | B2* | 5/2015 | Rettelbach | G10L 19/008 |
| | | | | 704/226 |
| 9,088,328 | B2* | 7/2015 | Gunzelmann | H04B 1/1036 |
| 9,202,463 | B2* | 12/2015 | Newman | G10L 25/78 |
| 9,613,612 | B2* | 4/2017 | Perkmann | G10K 11/17861 |
| 9,640,179 | B1* | 5/2017 | Hart | G10L 21/0208 |
| 9,653,060 | B1* | 5/2017 | Hilmes | H04M 9/082 |
| 9,659,555 | B1* | 5/2017 | Hilmes | H04R 3/005 |
| 9,792,897 | B1* | 10/2017 | Kaskari | G10L 15/20 |
| 9,818,425 | B1* | 11/2017 | Ayrapetian | G10L 21/0224 |
| 9,959,886 | B2* | 5/2018 | Anhari | G10L 25/78 |
| 10,134,425 | B1* | 11/2018 | Johnson, Jr. | G10L 25/87 |
| 10,192,567 | B1* | 1/2019 | Kamdar | G10L 25/84 |
| 11,950,062 | B1 | 4/2024 | Chu et al. | |
| 2009/0265169 | A1* | 10/2009 | Dyba | G10L 19/012 |
| | | | | 704/E15.001 |
| 2013/0332175 | A1* | 12/2013 | Setiawan | G10L 19/012 |
| | | | | 704/500 |
| 2014/0214676 | A1* | 7/2014 | Bukai | G10L 17/24 |
| | | | | 705/44 |
| 2015/0302845 | A1* | 10/2015 | Nakano | G10L 25/15 |
| | | | | 704/267 |
| 2018/0357995 | A1* | 12/2018 | Lee | G10K 11/178 |
| 2019/0108837 | A1* | 4/2019 | Christoph | G10L 15/30 |
| 2019/0222943 | A1* | 7/2019 | Andersen | G10L 21/0364 |
| 2019/0259381 | A1* | 8/2019 | Ebenezer | H04R 3/005 |
| 2020/0058320 | A1* | 2/2020 | Liu | G10L 15/22 |
| 2020/0243061 | A1* | 7/2020 | Sun | H04M 9/082 |
| 2022/0246161 | A1* | 8/2022 | Verbeke | G10L 21/034 |

OTHER PUBLICATIONS

Karan Ahuja, et al. "Direction-of-Voice (DoV) Estimation for Intuitive Speech Interaction with Smart Device Ecosystems," UIST Oct. 2020, Virtual Event, pp. 1121-1131. Retrieved from https://dl.acm.org/doi/10.1145/3379337.341558.

Mark Barnard and Wenwu Wang. "Audio head pose estimation using the direct to reverberant speech ratio," Speech Communication, vol. 85, 2016, pp. 98-108, https://dx.doi.org/10.1016/j.specom.2016.09.005.

Alberto Abad, et al. "Audio-based approaches to head orientation estimation in a smart-room," Conference paper at Interspeech 2007, Aug. 2007, pp. 590-593. Retrieved at https://www.researchgate.net/publication/221480124.

* cited by examiner

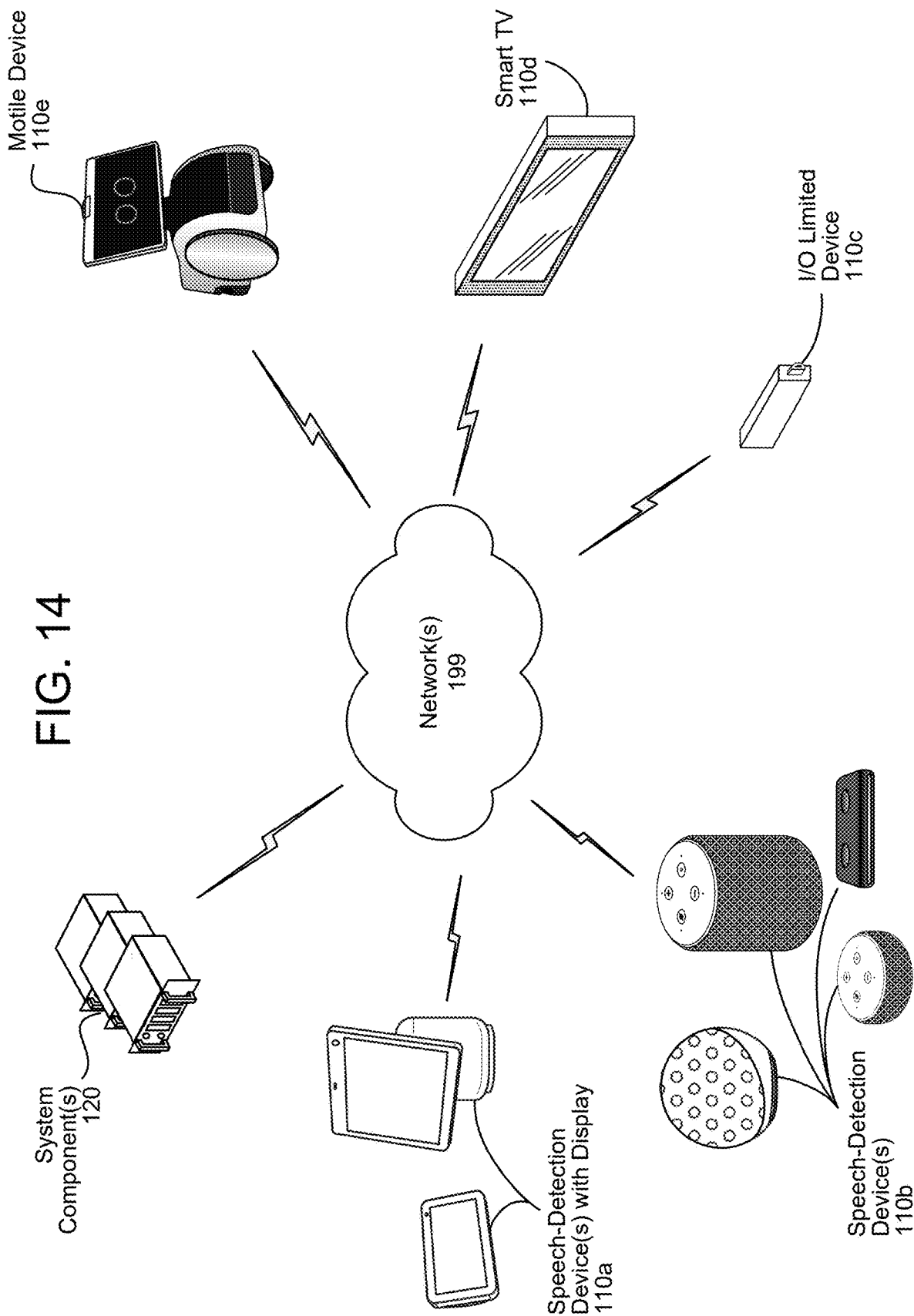

AUDIO-BASED USER ENGAGEMENT DETECTION

BACKGROUND

With the advancement of technology, the use and popularity of electronic devices has increased considerably. Electronic devices are commonly used to capture and process audio data.

BRIEF DESCRIPTION OF DRAWINGS

For a more complete understanding of the present disclosure, reference is now made to the following description taken in conjunction with the accompanying drawings.

FIG. 14 illustrates an example of a computer network for use with a speech processing system.

DETAILED DESCRIPTION

Figure 1:
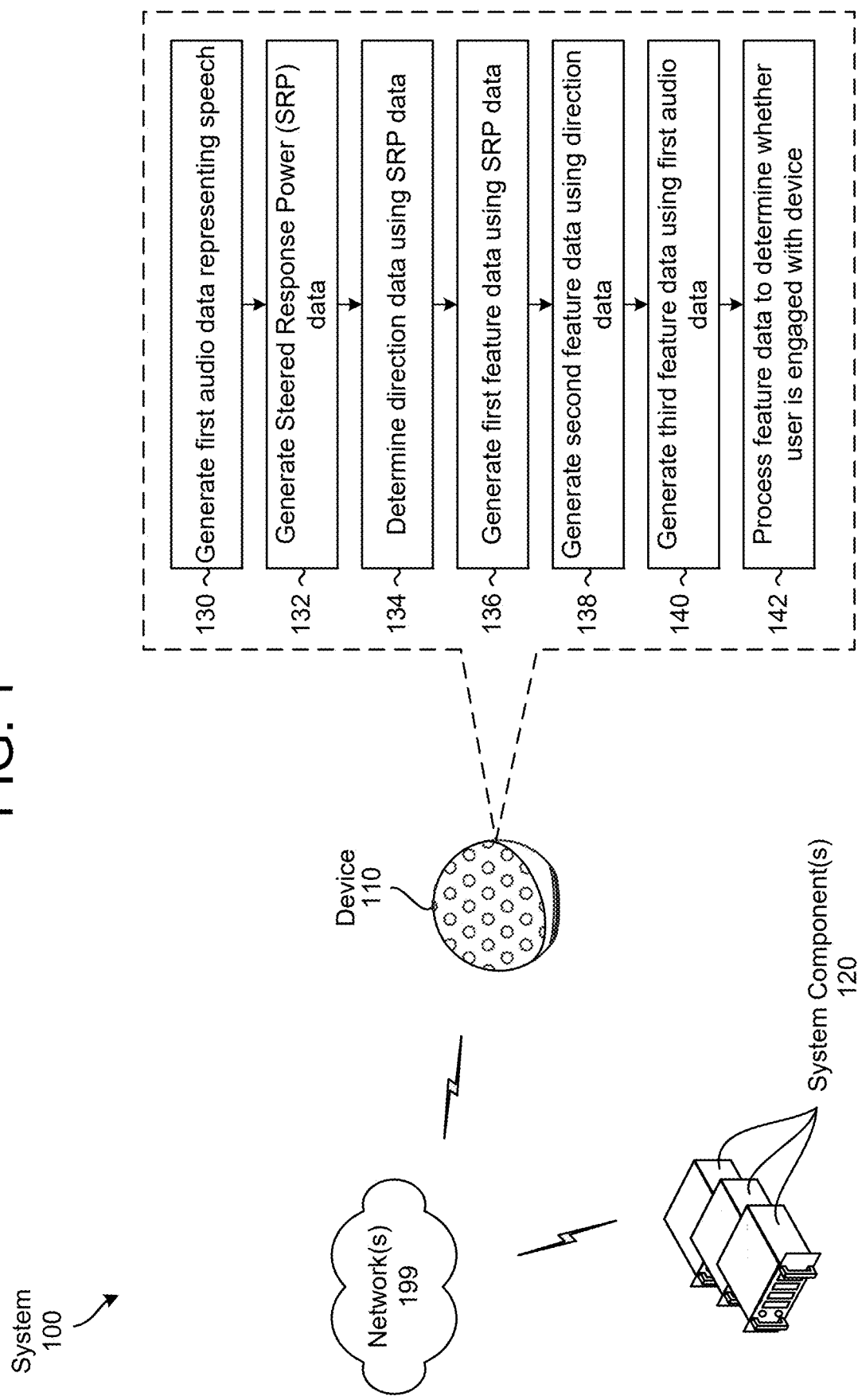
FIG. 1 illustrates a system configured to perform user engagement detection according to embodiments of the present disclosure.

An electronic device can leverage different computerized voice-enabled technologies. Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system, sometimes referred to as a spoken language understanding (SLU) system. Text-to-speech (TTS) is a field of computer science concerning transforming textual and/or other data into audio data that is synthesized to resemble human speech. ASR, NLU, and TTS may be used together as part of a speech-processing system.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

To improve dialog processing and/or a user experience, a system may be configured to use audio data to track user engagement and determine if speech is directed to a device. By extracting relevant features from the audio data, a device may perform User Engagement Detection (UED) processing to determine whether a user is engaged with the device without requiring a wakeword. For example, audio features may be input to a classifier to estimate whether a user is engaged, or to estimate an orientation of a speaker's head, and the head orientation may be used as a proxy for user engagement. Thus, if the head orientation is within an engagement zone (which varies based on distance to the user), the device may determine that the user is engaged with the device and perform language processing on input speech. In contrast, if the head orientation is outside of the engagement zone, the device may determine that the user is not engaged and ignore the input speech. To enable additional functionality, the classifier may optionally output a coarse estimate of the head orientation along with the UED determination. In addition, this audio-based UED determination and/or estimated head orientation may be combined with image-based UED processing to more accurately detect user engagement when a camera is available.

FIG. 1 illustrates a system configured to perform user engagement detection according to embodiments of the present disclosure. Although FIG. 1 and other figures/discussion illustrate the operation of the system in a particular order, the steps described may be performed in a different order (as well as certain steps removed or added) without departing from the intent of the disclosure. As illustrated in FIG. 1, the system 100 may include a device 110 and/or system component(s) 120 that may be communicatively coupled to network(s) 199.

The device 110 may receive audio corresponding to a spoken natural language input originating from a user. In some examples, the device 110 may process audio data and/or may send the audio data to the system component(s) 120. For example, the device 110 may send the audio data to the system component(s) 120 via an application that is installed on the device 110 and associated with the system component(s) 120. An example of such an application is the Amazon Alexa application that may be installed on a smart phone, tablet, or the like. The device 110 may also receive output data from the system component(s) 120 and generate a synthesized speech output.

In some examples, the device 110 may be an electronic device configured to capture audio data and/or image data. For example, the device 110 may include a microphone array configured to generate microphone audio data that captures input audio, although the disclosure is not limited thereto and the device 110 may include multiple microphones without departing from the disclosure. As is known and used herein, "capturing" an audio signal and/or generating audio data includes a microphone transducing audio waves (e.g., sound waves) of captured sound to an electrical signal and a codec digitizing the signal to generate the microphone audio data. In addition, the device 110 may include a camera or image sensor configured to generate image data that captures input video, although the disclosure is not limited thereto.

Whether the microphones are included as part of a microphone array, as discrete microphones, and/or a combination thereof, the device 110 may generate the microphone audio data using multiple microphones. For example, a first channel of the microphone audio data may correspond to a first microphone (e.g., k=1), a second channel may correspond to a second microphone (e.g., k=2), and so on until a final channel (K) corresponds to final microphone (e.g., k=K). For example, if the microphone array includes eight individual microphones, the audio data may include eight individual channels.

To improve a user experience, the system 100 may be configured to use audio data to track user engagement and determine if speech is directed to a device. By extracting relevant features from the audio data, a device may perform User Engagement Detection (UED) processing to determine whether a user is engaged with the device without requiring a wakeword. For example, audio features may be input to a classifier to estimate whether a user is engaged, or to estimate an orientation of the user's head, and the head orientation may be used as a proxy for user engagement. Thus, if the head orientation is within an engagement zone (which varies based on distance to the user), the device may determine that the user is engaged with the device and perform language processing on input speech. In contrast, if the head orientation is outside of the engagement zone, the device may determine that the user is not engaged and ignore the input speech. To enable additional functionality, the classifier may optionally output a coarse estimate of the head orientation along with the UED determination. In addition, this audio-based UED determination and/or estimated head orientation may be combined with image-based UED processing to more accurately detect user engagement when a camera is available.

As illustrated in FIG. 1, the device 110 may generate (130) first audio data corresponding to audio input captured by the microphone array. For example, the first audio data may include a representation of speech associated with a voice command or other user input, although the disclosure is not limited thereto.

As will be described in greater detail below, the device 110 may generate (132) steered response power (SRP) data and determine (134) direction data using the SRP data. For example, the device 110 may generate spatial power data by calculating a set of power values as a function of direction (e.g., spatial power). In addition, the device 110 may find a direction of a largest power peak represented in the spatial power data for each audio frame (e.g., every 8 ms) and may include corresponding direction information in the direction data. For example, the direction of the largest power peak may be represented using an azimuth defining a two-dimensional (2D) vector and/or an azimuth and an elevation defining a three-dimensional (3D) vector without departing from the disclosure. Additionally or alternatively, the direction data may indicate a distance associated with a sound source that corresponds to the largest power peak without departing from the disclosure. For example, the device 110 may identify a sound source associated with the largest power peak and determine a distance between the sound source and the device 110.

As will be described in greater detail below, the device 110 may perform feature extraction to generate three sets of features that are effective for performing UED processing. As illustrated in FIG. 1, the device 110 may generate (136) first feature data using the SRP data, may generate (138) second feature data using the direction data, and may generate (140) third feature data using the first audio data. For example, the first feature data may correspond to spatial power distribution, the second feature data may correspond to direction data determined during SSL processing, and the third feature data may correspond to cross-channel spectral characteristics determined from the first audio data.

The disclosure is not limited thereto, however, and in some examples the device 110 may receive additional inputs and/or generate additional sets of features without departing from the disclosure. For example, the device 110 may receive and/or generate additional features associated with an environment of the device 110. To illustrate an example, the device 110 may receive and/or generate features associated with room information, such as a size of the room, a reflection or reverberation level associated with the room (e.g., reverberation time), a room impulse response (RIR), and/or the like, although the disclosure is not limited thereto. By knowing the room information, the device 110 may condition other features and/or determine an expected range or limits associated with variables.

In some examples, the device 110 may use a voice activity detector (VAD) to may mark time intervals of active speech and may include some form of SNR value(s) corresponding to the active speech. Thus, the device 110 may only extract the features described above when (i) the first audio data corresponds to the time intervals of active speech (e.g., speech is detected) and (ii) SNR value(s) associated with the time intervals exceed a threshold value. When those conditions are satisfied, the device 110 may generate the first feature data (e.g., spatial power as a function of direction), the second feature data (e.g., direction variance), and/or the third feature data (e.g., coherence values), which may be useful to UED determination.

Finally, the device 110 may process (142) feature data to determine whether the user is engaged with the device 110. For example, the device 110 may determine that a user is engaged with the device 110 based on these features. In some examples, the device 110 may include a trained model, such as a Deep Neural Network (DNN), that operates on feature vector(s), which represent certain data that may be useful in determining whether or not speech is directed to the system.

In some examples, when the device 110 determines that the user is speaking (e.g., detects an utterance) and that the user is engaged with the device 110 (e.g., the speech is directed to the device 110), the device 110 may generate second audio data representing the utterance, may perform language processing on the second audio data to determine a voice command, and may cause an action to be performed based on the voice command. For example, the device 110 may generate the second audio data using a portion of the first audio data that represents the utterance and then the device 110 may perform language processing using the second audio data and/or send the second audio data to the system component(s) 120 to perform language processing without departing from the disclosure.

The disclosure is not limited thereto, however, and in other examples the device 110 may determine that the user is engaged with the device 110 and may perform an action for a fixed time window (e.g., duration of time). For example, in response to determining that the user is engaged at a first time, the system 100 may perform language processing for a duration of time (e.g., 10 seconds) after the first time. If the user continues to be engaged during this time window, the system 100 may continue performing language processing, but if the user has not re-engaged, the system 100 may end the language processing without departing from the disclosure. For example, the device 110 may process the second audio data and/or stream the second audio data to the system component(s) 120 while the user is engaged with the device 110 and may stop processing and/or streaming once the user fails to re-engage with the device 110.

To process voice commands from a particular user or to send audio data that only corresponds to the particular user, the device may attempt to isolate desired speech associated with the user from undesired speech associated with other users and/or other sources of noise, such as audio generated by loudspeaker(s) or ambient noise in an environment around the device. In some examples, the device may perform sound source localization (SSL) processing to distinguish between multiple sound sources represented in the audio data, as will be described in greater detail below. For example, the device 110 may perform SSL processing to generate SSL data, which may indicate when an individual sound source is represented in the audio data, a direction/location associated with the sound source, target likelihood estimates for each direction around the device (e.g., 360 degrees) and/or individual sound source, and/or the like, although the disclosure is not limited thereto.

In some examples, the system 100 may be configured to capture audio representing a voice command and perform an action responsive to the voice command. For example, in response to determining that the user is engaged with the device 110 (e.g., detecting a system-directed input command), the device 110 may identify a sound source (e.g., perform SSL track selection) corresponding to desired speech and generate audio data representing the desired speech. Using the audio data, the system 100 may perform language processing to determine an action to perform that is responsive to the desired speech (e.g., voice command). For example, the voice command(s) may control the device 110, audio devices (e.g., play music over loudspeaker(s), capture audio using microphone(s), or the like), multimedia devices (e.g., play videos using a display, such as a television, computer, tablet or the like), smart home devices (e.g., change temperature controls, turn on/off lights, lock/unlock doors, etc.), and/or the like without departing from the disclosure.

In some examples, the device 110 may be configured to perform the language processing without departing from the disclosure. For example, the device 110 may send the output audio data to a language processing component associated with the device 110 and the language processing component may perform language processing using the output audio data to determine an action responsive to the voice command. To cause the action to be performed, the device 110 may perform the action itself, may send a command to other device(s) associated with the user profile, may send the command to the system component(s) 120, and/or the like without departing from the disclosure.

The disclosure is not limited thereto, however, and in other examples the system component(s) 120 may be configured to perform the language processing and the device 110 may send output audio data associated with the selected sound source (e.g., selected SSL track) to the system component(s) 120 via the network(s) 199. For example, the system component(s) 120 may perform language processing using the output audio data to determine an action to be performed that is responsive to the voice command. The system component(s) 120 may cause the action to be performed by sending a command to the device 110 and/or other device(s) associated with a user profile.

The system component(s) 120 may be remote system such as a group of computing components located geographically remote from device 110 but accessible via network 199 (for example, servers accessible via the internet). The system component(s) 120 may also include a remote system that is physically separate from device 110 but located geographically close to device 110 and accessible via network 199 (for example a home server located in a same residence as device 110. System component(s) 120 may also include some combination thereof, for example where certain components/operations are performed via a home server(s) and others are performed via a geographically remote server(s).

In some examples, the device 110 may optionally include a camera for capturing image and/or video data, which is collectively referred to as image data. Thus, the system 100 may optionally use computer vision (CV) techniques operating on image data to perform active speaker detection. For example, the system 100 may use image data to determine when a user is speaking and/or which user is speaking. The system 100 may use face detection techniques to detect a human face represented in image data (for example using object detection component as discussed below). The system 100 may use a classifier or other model configured to determine whether a face is looking at a device 110. The system 100 may also be configured to track a face in image data to understand which faces in the video are belonging to the same person and where they may be located in image data and/or relative to a device 110. The system 100 may also be configured to determine an active speaker, for example by determining which face(s) in image data belong to the same person and whether the person is speaking or not. The system 100 may use components such as user recognition component, object tracking component, and/or other components to perform such operations.

The assistant can leverage different computerized voice-enabled technologies. Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system, sometimes referred to as a spoken language understanding (SLU) system. Text-to-speech (TTS) is a field of computer science concerning transforming textual and/or other data into audio data that is synthesized to resemble human speech. ASR, NLU, and TTS may be used together as part of a speech-processing system.

The system 100 may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

To improve dialog processing, a system 100 may be configured with a multi-user dialog (MUD) mode that allows the system to participate in a dialog with multiple users. As part of this mode (or operating in a normal mode using multi-user dialog components/operations) the system 100 may be configured to identify when a user is speaking to the system and respond accordingly. The system 100 may also be configured to identify when a user is speaking with another user and determine that such user-to-user speech does not require system action and so the system can ignore such speech. The system 100 may also be configured to identify when a user is speaking with another user and determine when such user-to-user speech is relevant to the system such that it is appropriate for the system to interject or respond to the user-to-user speech with information that is relevant to the user, as if the system were a participant in a conversation. The system 100 may also be configured to maintain a natural pace during a conversation and to insert conversational cues (such as "uh huh," "mm," or the like) to indicate to the user that the system is maintaining a connection with the user(s) for purposes in participating in the dialog. The system 100 may use models configured to make such determinations based on audio data, image data showing the user(s) and other information. The system 100 may also be configured to discontinue a multi-user dialog mode upon indication by the user, timeout, or other condition.

The system 100 may also use CV techniques operating on image data (for example in a multi-user scenario) to determine whether a particular input (for example speech or a gesture) is device directed. The system 100 may thus use image data to determine when a user is speaking to the system or to another user. The system 100 may start conversing with one person, and switch to a second person when the second person gives a visual indication that they are about to talk to the system. Such a visual indication may include, for example, raising a hand, turning to look from another user to look at a device 110, or the like. To make such determinations the system 100 may use face detection techniques to detect a human face represented in image data (for example using object detection component as discussed below). The system 100 may use a classifier or other model configured to determine whether a face is looking at a device 110 (for example using an object tracking component as discussed below). The system 100 may also be configured to track a face in image data to understand which faces in the video are belonging to the same person and where they may be located in image data and/or relative to a device 110 (for example using user recognition component and/or object tracking component as discussed below). The system 100 may also be configured to determine an active speaker, for example by determining which face(s) in image data belong to the same person and whether the person is speaking or not (for example using image data of a user's lips to see if they are moving and matching such image data to data regarding a user's voice and/or audio data of speech and whether the words of the speech match the lip movement). The system 100 may use components such as user recognition component, object tracking component, and/or other components to perform such operations. To determine whether speech or another input is system directed, the system 100 may use the above information as well as techniques described below in reference to system directed input detector 1185 and FIG. 11.

Beamforming and/or other audio processing techniques may also be used to determine a voice's direction/distance relative to the device 110. Such audio processing techniques, in combination with image processing techniques may be used (along with user identification techniques or operations such as those discussed below) may be used to match a voice to a face and track a user's voice/face in an environment of the device 110 whether a user appears in image data (e.g., in the field of view of a camera of a device 110) or whether a user moves out of image data but is still detectable by the system 100 through audio data of the user's voice (or other data).

The system 100 may also be configured to discern user-to-user speech and determine when it is appropriate for the system to interject and participate in such a conversation and when it is appropriate for the system to allow the users to converse without interjecting/participating. The system 100 may be configured to provide personalized responses and proactively participate in a conversation, even when the system is not directly addressed. The system 100 may determine (in natural turn taking mode) when users are talking to each other, determine whether these are simply sidebar conversations or if they are relevant to the ongoing conversation with the system (for example relevant to the subject of a system-involved dialog), and may proactively interject with helpful information that is personalized and directed to the user addressed by the system. Such operations may allow the system to function as an equal participant in a multi-party conversation. To allow for such operations the system 100 may be configured for discourse understanding as part of NLU and dialog management.

The system 100 may also be configured to allow a natural pace during a conversation. The system 100 may include component(s) to allow the system to "backchannel" during gaps in a conversation/dialog and to process breaks and turns within a conversation. For example, the system 100 may be configured to encourage a user to continue speaking by insertion of turn holding cues such as uh, mm, or utterances that are pragmatically and syntactically incomplete followed by a silence. This allows the system to not interrupt a user's flow of the thought and gives the user sufficient time to respond. A classifier or other model may be configured to take into account turn holding cues as part of a spoken interaction between the system and a user. Such a classifier may be included in (and such operations may be managed by) one or more system components, for example dialog manager, language output component, or other component(s). The system 100 may be configured to input audio data, image data, and other data to consider acoustic cues, prosody and other intonation classifications, as well as computer-vision features discussed herein. For example, if there is a silence that is classified as a pause, the system 100 may returns an empty TTS response and continue to "listen." After an extended silence, the system 100 may return uh huh, ok, hmm, right, yeah, etc. to encourage a user to continue talking. Such backchannel expressions the system's attention to the user without interruption of the user. For example when a user is adding elements to a list, the system 100 may insert a backchannel indication in a gap after an utterance with the anticipation that more elements might get added by the user. This gives the customer more time while being reminded that the system is waiting and so encourages more participation from them or other parties in the conversation. The system 100 may be trained to recognize such conversational components using simulated and model utterances which are syntactically and pragmatically incomplete. The system 100 may also be trained using simulated syntactic incompleteness with utterances including pauses randomly included at the end of phrases within the utterance. The system 100 may also be trained using simulated pragmatic incompleteness with utterances including pauses before all entities that are requested to be updated are provided.

The audio data may be generated by a microphone array of the device 110 and therefore may correspond to multiple channels. For example, if the microphone array includes eight individual microphones, the audio data may include eight individual channels. In some examples, the device 110 may perform sound source localization (SSL) processing to separate the audio data based on sound source(s) and indicate when an individual sound source is represented in the audio data and/or a direction/location associated with the sound source.

An audio signal is a representation of sound and an electronic representation of an audio signal may be referred to as audio data, which may be analog and/or digital without departing from the disclosure. For ease of illustration, the disclosure may refer to either audio data (e.g., microphone audio data, input audio data, etc.) or audio signals (e.g., microphone audio signal, input audio signal, etc.) without departing from the disclosure. Additionally or alternatively, portions of a signal may be referenced as a portion of the signal or as a separate signal and/or portions of audio data may be referenced as a portion of the audio data or as separate audio data. For example, a first audio signal may correspond to a first period of time (e.g., 30 seconds) and a portion of the first audio signal corresponding to a second period of time (e.g., 1 second) may be referred to as a first portion of the first audio signal or as a second audio signal without departing from the disclosure. Similarly, first audio data may correspond to the first period of time (e.g., 30 seconds) and a portion of the first audio data corresponding to the second period of time (e.g., 1 second) may be referred to as a first portion of the first audio data or second audio data without departing from the disclosure. Audio signals and audio data may be used interchangeably, as well; a first audio signal may correspond to the first period of time (e.g., 30 seconds) and a portion of the first audio signal corresponding to a second period of time (e.g., 1 second) may be referred to as first audio data without departing from the disclosure.

In some examples, the audio data may correspond to audio signals in a time-domain. However, the disclosure is not limited thereto and the device 110 may convert these signals to a subband-domain or a frequency-domain prior to performing additional processing without departing from the disclosure. For example, the device 110 may convert the time-domain signal to the subband-domain by applying a bandpass filter or other filtering to select a portion of the time-domain signal within a desired frequency range. Additionally or alternatively, the device 110 may convert the time-domain signal to the frequency-domain using a Fast Fourier Transform (FFT) and/or the like.

As used herein, audio signals or audio data (e.g., microphone audio data, or the like) may correspond to a specific range of frequency bands. For example, the audio data may correspond to a human hearing range (e.g., 20 Hz-20 kHz), although the disclosure is not limited thereto.

As used herein, a frequency band (e.g., frequency bin) corresponds to a frequency range having a starting frequency and an ending frequency. Thus, the total frequency range may be divided into a fixed number (e.g., 256, 512, etc.) of frequency ranges, with each frequency range referred to as a frequency band and corresponding to a uniform size. However, the disclosure is not limited thereto and the size of the frequency band may vary without departing from the disclosure.

In some examples, the device 110 may generate microphone audio data $z(t)$ in the time-domain, which is comprised of a sequence of individual samples of audio data. Thus, $z(t)$ denotes an individual sample that is associated with a time t. While the microphone audio data $z(t)$ is comprised of a plurality of samples, in some examples the device 110 may group a plurality of samples and process them together. For example, the device 110 may group a number of samples together in a frame to generate microphone audio data $z(n)$. As used herein, a variable $z(n)$ corresponds to the time-domain signal and identifies an individual frame (e.g., fixed number of samples s) associated with a frame index n.

In some examples, the device 110 may convert microphone audio data $z(t)$ from the time-domain to the subband-domain. For example, the device 110 may use a plurality of bandpass filters to generate microphone audio data $z(t, k)$ in the subband-domain, with an individual bandpass filter centered on a narrow frequency range. Thus, a first bandpass filter may output a first portion of the microphone audio data $z(t)$ as a first time-domain signal associated with a first subband (e.g., first frequency range), a second bandpass filter may output a second portion of the microphone audio data $z(t)$ as a time-domain signal associated with a second subband (e.g., second frequency range), and so on, such that the microphone audio data $z(t, k)$ comprises a plurality of individual subband signals (e.g., subbands). As used herein, a variable $z(t, k)$ corresponds to the subband-domain signal and identifies an individual sample associated with a particular time t and tone index k.

For ease of illustration, the previous description illustrates an example of converting microphone audio data $z(t)$ in the time-domain to microphone audio data $z(t, k)$ in the subband-domain. However, the disclosure is not limited thereto, and the device 110 may convert microphone audio data $z(n)$ in the time-domain to microphone audio data $z(n, k)$ the subband-domain without departing from the disclosure.

Additionally or alternatively, the device 110 may convert microphone audio data z(n) from the time-domain to a frequency-domain. For example, the device 110 may perform Discrete Fourier Transforms (DFTs) (e.g., Fast Fourier transforms (FFTs), short-time Fourier Transforms (STFTs), and/or the like) to generate microphone audio data Z(n, k) in the frequency-domain. As used herein, a variable Z(n, k) corresponds to the frequency-domain signal and identifies an individual frame associated with frame index n and tone index k.

A Fast Fourier Transform (FFT) is a Fourier-related transform used to determine the sinusoidal frequency and phase content of a signal, and performing FFT produces a one-dimensional vector of complex numbers. This vector can be used to calculate a two-dimensional matrix of frequency magnitude versus frequency. In some examples, the system 100 may perform FFT on individual frames of audio data and generate a one-dimensional and/or a two-dimensional matrix corresponding to the microphone audio data Z(n). However, the disclosure is not limited thereto and the system 100 may instead perform short-time Fourier transform (STFT) operations without departing from the disclosure. A short-time Fourier transform is a Fourier-related transform used to determine the sinusoidal frequency and phase content of local sections of a signal as it changes over time.

Using a Fourier transform, a sound wave such as music or human speech can be broken down into its component "tones" of different frequencies, each tone represented by a sine wave of a different amplitude and phase. Whereas a time-domain sound wave (e.g., a sinusoid) would ordinarily be represented by the amplitude of the wave over time, a frequency-domain representation of that same waveform comprises a plurality of discrete amplitude values, where each amplitude value is for a different tone or "bin." So, for example, if the sound wave consisted solely of a pure sinusoidal 1 kHz tone, then the frequency-domain representation would consist of a discrete amplitude spike in the bin containing 1 kHz, with the other bins at zero. In other words, each tone "k" is a frequency index (e.g., frequency bin). To illustrate an example, the system 100 may apply FFT processing to the time-domain microphone audio data z(n), producing the frequency-domain microphone audio data Z(n, k), where the tone index "k" (e.g., frequency index) ranges from 0 to K and "n" is a frame index ranging from 0 to N. Thus, the history of the values across iterations is provided by the frame index "n", which ranges from 1 to N and represents a series of samples over time.

As part of generating audio data corresponding to an individual sound source and/or SSL track, the device 110 may be configured to perform beamforming. For example, the device 110 may process the audio data using a beamformer component to generate directional audio data in order to isolate a speech signal represented in the audio data. However, in order to isolate the desired speech signal, in some examples the device 110 may identify a look direction associated with the desired speech signal. The disclosure is not limited thereto, however, and in other examples the device 110 may perform beamforming to generate a plurality of directional audio data without departing from the disclosure. For example, the device 110 may determine a first number of directional audio signals using a fixed configuration, although the disclosure is not limited thereto.

The device 110 may perform sound source localization processing to separate the audio data based on sound source and indicate when an individual sound source is represented in the audio data. To illustrate an example, the device 110 may detect a first sound source (e.g., first portion of the audio data corresponding to a first direction relative to the device 110) during a first time range, a second sound source (e.g., second portion of the audio data corresponding to a second direction relative to the device 110) during a second time range, and so on. Thus, the SSL data may include a first portion or first SSL data indicating when the first sound source is detected, a second portion or second SSL data indicating when the second sound source is detected, and so on.

The device 110 may use Time of Arrival (TOA) processing, Delay of Arrival (DOA) processing, and/or the like to determine the SSL data, although the disclosure is not limited thereto. In some examples, the SSL data may include multiple SSL tracks (e.g., individual SSL track for each unique sound source represented in the audio data), along with additional information for each of the individual SSL tracks. For example, for a first SSL track corresponding to a first sound source (e.g., audio source), the SSL data may indicate a position and/or direction associated with the first sound source location, a signal quality metric (e.g., power value) associated with the first SSL track, and/or the like, although the disclosure is not limited thereto.

The device 110 may be configured to track a sound source over time, collecting information about the sound source and maintaining a position of the sound source relative to the device 110. Thus, the device 110 may track the sound source even as the device 110 and/or the sound source move relative to each other. In some examples, the device 110 may determine position data including a unique identification indicating an individual sound source, along with information about a position of the sound source relative to the device 110, a location of the sound source using a coordinate system or the like, an audio type associated with the sound source, additional information about the sound source (e.g., user identification, type of sound source, etc.), and/or the like, although the disclosure is not limited thereto.

The device 110 may process the audio data to identify unique sound sources and determine a direction corresponding to each of the sound sources. For example, the device 110 may identify a first sound source in a first direction (e.g., first user), a second sound source in the second direction (e.g., reflection associated with an acoustically reflective surface), and/or a third sound source in a third direction (e.g., second user). In some examples, the device 110 may determine the directions associated with each of the sound sources and represent these directions as a value in degrees (e.g., between 0-360 degrees) relative to a position of the device 110, although the disclosure is not limited thereto.

As part of identifying unique sound sources, the device 110 may generate sound track data representing sound tracks. For example, the sound track data may include an individual sound track for each sound source, enabling the device 110 to track multiple sound sources simultaneously. The sound track data may represent a sound track using a power sequence as a function of time, with one power value per frame. The power sequence may include one or more peaks, with each peak (e.g., pulse) corresponding to an audible sound.

As described in greater detail below, the device 110 may detect an audible sound by identifying a short power sequence corresponding to a peak and may attempt to match the short power sequence to an already established sound track. For example, the device 110 may compare the short power sequence and a corresponding direction (e.g., direction of arrival associated with the audible sound) to existing sound tracks and match the short power sequence to an already established sound track, if appropriate. Thus, an individual sound track may include multiple audible sounds associated with a single sound source, even as a direction of the sound source changes relative to the device 110. The sound track may describe acoustic activities and have a start time, end time, power, and direction. In some examples, each audible sound (e.g., peak) included in the sound track may be associated with a start time, end time, power, and/or direction corresponding to the audible sound, although the disclosure is not limited thereto.

Figure 2:
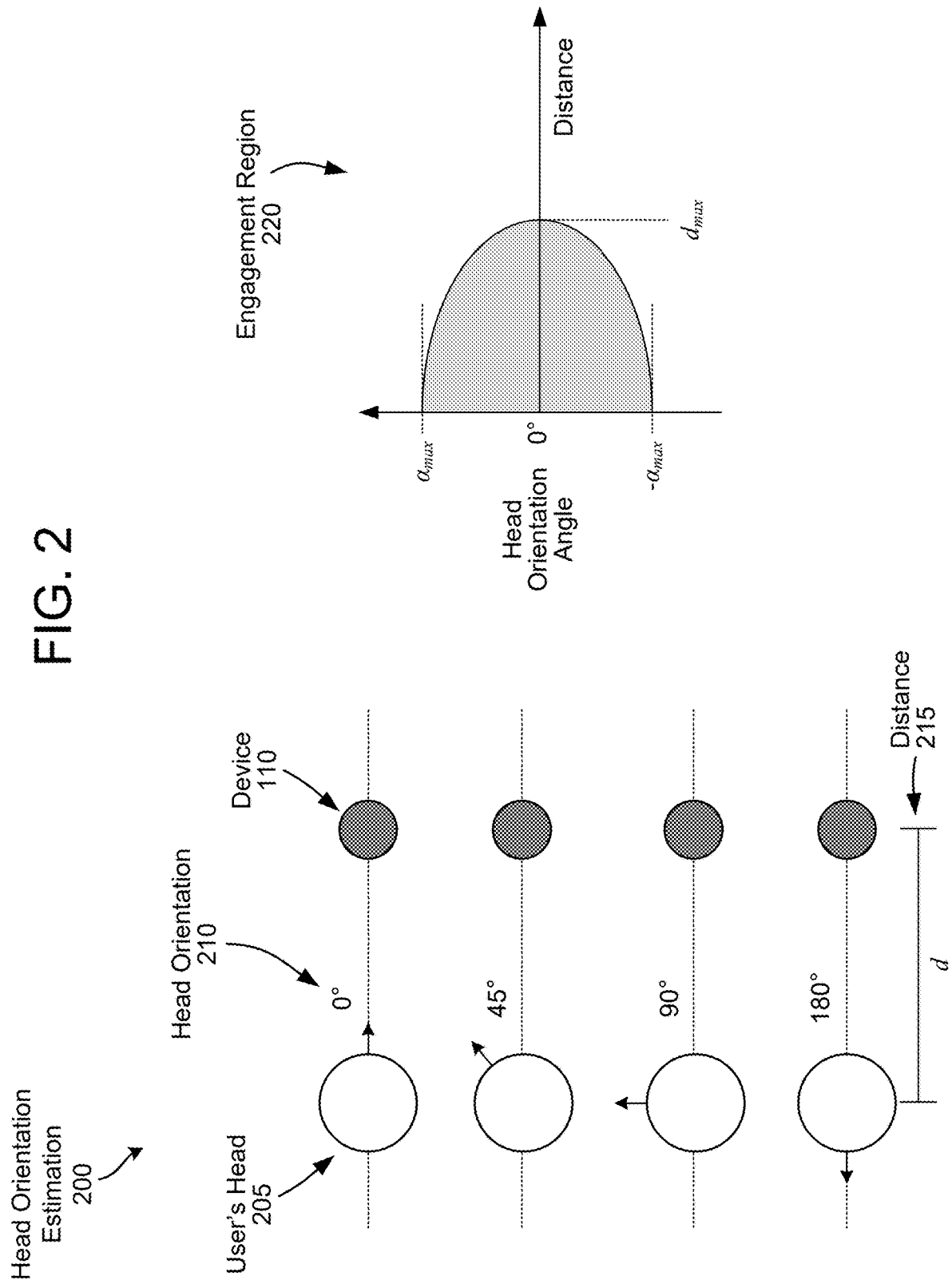
FIG. 2 illustrates an example of using head orientation as a proxy for user engagement according to embodiments of the present disclosure.

FIG. 2 illustrates an example of using head orientation as a proxy for user engagement according to embodiments of the present disclosure. As described above, in some examples the device 110 may perform user engagement detection (UED) processing using head orientation as a proxy for user engagement. For example, a user may be considered to be engaged with the device 110 if one or more of the following conditions are true:

The user is looking at the device while talking, which can be determined by estimating a head orientation angle;
The user is in close proximity to the device 110; and/or
The user is stationary or moving relatively slowly.

To determine whether the first condition is true, the device 110 may perform head orientation estimation 200 to estimate a head orientation 210 associated with the user's head 205 and determine whether it is within an engagement region 220. As illustrated in FIG. 2, the head orientation 210 associated with the user's head 205 indicates a direction that the user is facing (e.g., user's face is pointed in a first direction) relative to a reference direction associated with the device 110 (e.g., direct path from user's head 205 to the device 110 corresponds to a second direction). For example, the second direction may be associated with a first angle (e.g., 0°) and the head orientation 210 may indicate an offset between the first direction and the second direction. As illustrated in FIG. 2, facing directly at the device 110 corresponds to a first head orientation angle (e.g., 0°), facing partially toward the device 110 corresponds to a second head orientation angle (e.g., 45°), facing perpendicular to the device 110 corresponds to a third orientation angle (e.g., 90°), and facing in the opposite direction as the device 110 corresponds to a fourth orientation angle (e.g., 180°).

While the third orientation angle (e.g., 90°) and the fourth orientation angle (e.g., 180°) are not considered to be engaged with the device 110, the second orientation angle (e.g., 45°) may be engaged with the device 110 depending on a distance 215 between the user's head 205 and the device 110. This is illustrated in the engagement region 220, which extends to a maximum orientation angle (e.g., $+/-\alpha_{max}$) when the user is in close proximity to the device 110 (e.g., distance is close to zero) and gradually decreases as the distance increases. For example, the range of head orientation angles considered to be within the engagement region 220 narrows considerably as the distance between the user and the device 110 approaches a maximum distance (e.g., $d_{max}$), indicating that the user has to be looking directly at the device 110 at farther distances. If the user is beyond the maximum distance (e.g., $d_{max}$), the user is not considered to be engaged with the device 110 regardless of the head orientation 210.

The device 110 may estimate a head orientation angle by analyzing frequency components of the received sound (e.g., audio data generated by microphones). For example, when the user's head 205 is not facing directly toward the device 110, sound emanating from the user's mouth becomes obstructed, leading to various degrees of high-frequency attenuation. Further, a direct-to-reverberant-ratio (DRR) becomes weaker at the fourth orientation angle (e.g., 180°) compared to the first orientation angle (e.g., 0°), as the signals reach the microphones as reflections caused by the environment.

As used herein, the user is considered to be engaged with the device 110 for purposes of user engagement detection when the user is talking to the device 110 (e.g., speech is detected) while a head orientation angle is near the first orientation angle (e.g., 0°) or within a desired range, such as the engagement region 220. For example, at close distance the user is said to be engaged if the head orientation angle is within a first range [$+/-\alpha_{max}$], such as [−45°, 45°], although the disclosure is not limited thereto. However, this range gradually decreases as the distance between the user and the device 110 increases and approaches the maximum distance (e.g., $d_{max}$), beyond which the user is not considered to be engaged with the device 110 regardless of head orientation. Thus, the user is considered to be engaged with the device 110 when the distance 215 does not exceed the maximum distance (e.g., $d_{max}$) and the head orientation 210 is within a range of head orientation angles indicated by the engagement region 220. While FIG. 2 illustrates a simple example of the engagement region 220, the disclosure is not limited thereto and the exact boundaries of the engagement region 220 may vary depending on the user, the room or environment, historical data, and/or the like.

Figure 3:
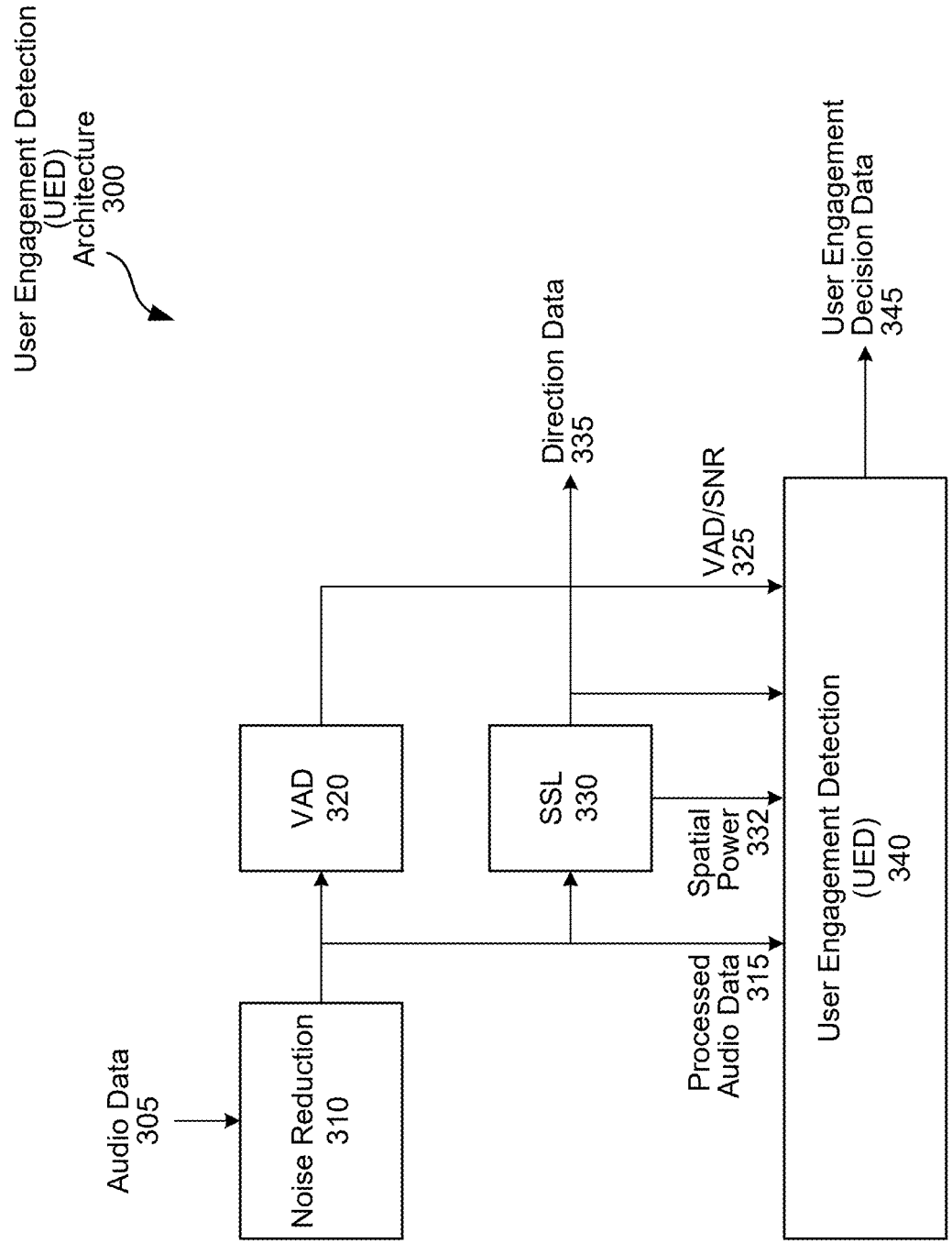
FIG. 3 is a block diagram illustrating an example of user engagement detection architecture according to embodiments of the present disclosure.

FIG. 3 is a block diagram illustrating an example of user engagement detection architecture according to embodiments of the present disclosure. As described above, the device 110 may perform user engagement detection (UED) processing to determine whether an input relating to audio data 305 is directed to the device 110 (e.g., system directed). For example, a UED component 340 may be configured to process one or more inputs (e.g., feature data) extracted from the audio data 305 to generate user engagement decision data 345 indicating whether the user is engaged with the device 110, which may be used as a proxy for whether an input is system directed. Thus, when the user engagement decision data 345 indicates that the user is engaged with the device 110, the device 110 may perform additional processing using the audio data 305 and/or send the audio data 305 to the system component(s) 120 for additional processing, whereas when the user engagement decision data 345 indicates that the user is not engaged with the device 110, the device 110 may ignore the audio data 305. The user engagement decision data 345 may include a numerical value indicating an engagement level of a user on a scale of engagement. The user engagement decision data 345 may also include a confidence value indicating a confidence level in the engagement value.

In addition to the UED component 340, user engagement detection (UED) architecture 300 may include noise reduction component(s) 310, a voice activity detector (VAD) 320, and a sound source localization (SSL) component 330. As illustrated in FIG. 3, the noise reduction component(s) 310 may be configured to process the audio data 305 to generate processed audio data 315. For example, the noise reduction component(s) 310 may correspond to an acoustic front-end of the device 110 and may be configured to perform echo cancellation, noise reduction, adaptive interference cancellation, and/or the like to generate the processed audio data 315. While the processed audio data 315 may be input to the UED component 340 to generate first feature data, it may also be input to the VAD 320 and/or the SSL component 330 to generate additional feature data.

In some examples, the VAD 320 may process the processed audio data 315 and generate VAD/SNR data 325, which may be input to the UED component 340 as second feature data. For example, the VAD 320 may determine whether voice activity (e.g., speech) is detected in the processed audio data 315 and, if voice activity is detected (e.g., speech is represented in the processed audio data 315), may determine signal-to-noise ratio (SNR) values associated with the speech. Thus, the VAD/SNR data 325 may indicate that speech is present and/or SNR values corresponding to the speech, although the disclosure is not limited thereto.

The VAD 320 may operate to detect whether the processed audio data 315 includes speech or not. In some examples, the VAD/SNR data 325 may include a binary indicator. Thus, if the processed audio data 315 includes speech, the VAD 320 may output a first indicator that the processed audio data 315 does includes speech (e.g., a 1) and if the processed audio data 315 does not includes speech, the VAD 320 may output a second indicator that the processed audio data 315 does not includes speech (e.g., a 0). In other examples, the VAD/SNR data 325 may include a score (e.g., a number between 0 and 1) corresponding to a likelihood that the processed audio data 315 includes speech, although the disclosure is not limited thereto.

In addition, the VAD 320 may also perform start-point detection as well as end-point detection where the VAD 320 determines when speech starts in the processed audio data 315 and when it ends in the processed audio data 315. Thus the VAD/SNR data 325 may also include indicators of a speech start point and/or a speech endpoint for use by other components of the system. For example, the start-point and end-points may demarcate the processed audio data 315 that is sent to a speech processing component and/or language processing component, although the disclosure is not limited thereto. The VAD/SNR data 325 may be associated with a same unique ID as the processed audio data 315 for purposes of tracking system processing across various components.

The VAD 320 may use various techniques to determine whether the processed audio data 315 includes speech. In some examples, the VAD 320 may apply voice-activity detection (VAD) techniques. Such techniques may determine whether speech is present in the audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the VAD 320 may implement a classifier configured to distinguish speech from background noise. The classifier may be implemented by techniques such as linear classifiers, support vector machines, and decision trees. In still other examples, the VAD 320 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

The VAD may be configured to be robust to background noise so as to accurately detect when audio data actually includes speech or not. The VAD 320 may operate on the processed audio data 315 such as that sent by device 110 or may operate on feature vectors or other data representing the processed audio data 315. For example, the VAD 320 may take the form of a deep neural network (DNN) and may operate on a single feature vector representing the entirety of processed audio data 315 received from the device or may operate on multiple feature vectors, for example feature vectors representing frames of audio data where each frame covers a certain amount of time of audio data (e.g., 25 ms).

In some examples, the VAD 320 may consider speaker ID information (such as may be output by a user recognition component) and/or directionality data that may indicate what direction (relative to the device 110) the incoming audio was received from. For example, the directionality data may have been determined by a beamformer or other component of the device 110. While not illustrated in FIG. 3, in some examples the VAD 320 may receive the directionality data from the SSL component 330, such as spatial power data 332 and/or direction data 335, although the disclosure is not limited thereto. The VAD 320 may also consider data regarding a previous utterance which may indicate whether the further audio data received by the system is likely to include speech. Other VAD techniques may also be used without departing from the disclosure.

If the VAD/SNR data 325 indicates that no speech was detected, the device 110 may discontinue processing with regard to the processed audio data 315, thus saving computing resources that might otherwise have been spent on other processes (e.g., ASR for the processed audio data 315, etc.). If the VAD/SNR data 325 indicates that speech was detected, the system 100 may make a determination as to whether the speech was or was not directed to the device 110 using the UED component 340, as described in greater detail below.

As described in greater detail above, in some examples the device 110 may perform sound source localization (SSL) processing to distinguish between multiple sound sources represented in the processed audio data 315. For example, the device 110 may perform SSL processing to generate SSL data, which may indicate when an individual sound source is represented in the audio data, a direction/location associated with the sound source, power values and/or target likelihood estimates for each direction around the device (e.g., 360 degrees) and/or individual sound source, and/or the like, although the disclosure is not limited thereto.

In the example illustrated in FIG. 3, the SSL component 330 may perform SSL processing using the processed audio data 315 to generate spatial power data 332 and direction data 335. In some examples, the SSL component 330 may calculate steered response power (SRP) using the multi-channel processed audio data 315. For example, the SSL component 330 may generate the spatial power data 332 by calculating a set of power values as a function of direction (e.g., spatial power). In addition, the SSL component 330 may find a direction of a largest power peak represented in the spatial power data 332 for each audio frame (e.g., every 8 ms) and may include corresponding direction information in the direction data 335. For example, the direction of the largest power peak may be represented using an azimuth defining a two-dimensional (2D) vector and/or an azimuth and an elevation defining a three-dimensional (3D) vector without departing from the disclosure. Additionally or alternatively, the direction data 335 may indicate a distance associated with a sound source that corresponds to the largest power peak without departing from the disclosure. For example, the device 110 may identify a sound source associated with the largest power peak and determine a distance between the sound source and the device 110.

As illustrated in FIG. 3, the UED component 340 may receive a variety of inputs and may generate the user engagement decision data 345. For example, inputs to the UED component 340 may include the processed audio data 315, the VAD/SNR data 325, the spatial power data 332, and/or the direction data 335, although the disclosure is not limited thereto. As described above, the VAD/SNR data 325 may mark time intervals of active speech and may include some form of SNR value(s) corresponding to the active speech. In some examples, the UED component 340 may only perform UED processing when (i) the processed audio data 315 corresponds to the time intervals of active speech (e.g., speech is detected in the processed audio data 315) and (ii) SNR value(s) associated with the time intervals exceed a threshold value. When those conditions are satisfied, the UED component 340 may take as input one or more audio signals (e.g., processed audio data 315), the VAD/SNR data 325 (e.g., SNR value(s)), the spatial power data 332 (e.g., spatial power as a function of direction), and/or the direction data 335 (e.g., direction of the dominant sound source) to derive features (e.g., feature vector(s)) used to generate the user engagement decision data 345.

The disclosure is not limited thereto, however, and in some examples the device 110 may receive additional inputs and/or generate additional sets of features without departing from the disclosure. For example, the device 110 may receive and/or generate additional features associated with an environment of the device 110. To illustrate an example, the device 110 may receive and/or generate features associated with room information, such as a size of the room, a reflection or reverberation level associated with the room (e.g., reverberation time), a room impulse response (RIR), and/or the like, although the disclosure is not limited thereto. By knowing the room information, the device 110 may condition other features and/or determine an expected range or limits associated with variables.

As will be described in greater detail below, the UED component 340 may determine that a user is engaged with the device 110 based on these features. In some examples, the UED component 340 may include a trained model, such as a Deep Neural Network (DNN), that operates on feature vector(s), which represent certain data that may be useful in determining whether or not speech is directed to the system. For example, the processed audio data 315, the VAD/SNR data 325, the spatial power data 332, and/or the direction data 335 may be used to create the feature vector(s) operable by the UED component 340, as described in greater detail below with regard to FIG. 4.

In some examples, when the device 110 determines that the user is speaking (e.g., detects an utterance) and that the user is engaged with the device 110 (e.g., the speech is directed to the device 110), the device 110 may generate first audio data representing the utterance, may perform language processing on the first audio data to determine a voice command, and may cause an action to be performed based on the voice command. For example, the device 110 may generate the first audio data using a portion of the processed audio data 315 that represents the utterance and then the device 110 may perform language processing using the first audio data and/or send the first audio data to the system component(s) 120 to perform language processing without departing from the disclosure.

The disclosure is not limited thereto, however, and in other examples the device 110 may determine that the user is engaged with the device 110 and may perform an action for a fixed time window (e.g., duration of time). For example, in response to determining that the user is engaged at a first time, the system 100 may perform language processing for a duration of time (e.g., 10 seconds) after the first time. If the user continues to be engaged during this time window, the system 100 may continue performing language processing, but if the user has not re-engaged, the system 100 may end the language processing without departing from the disclosure. For example, the device 110 may process the first audio data and/or stream the first audio data to the system component(s) 120 while the user is engaged with the device 110 and may stop processing and/or streaming once the user fails to re-engage with the device 110.

In some examples, the system 100 may be configured to capture audio representing a voice command and perform an action responsive to the voice command. For example, in response to detecting a system-directed input command, the device 110 may identify a sound source (e.g., perform SSL track selection) corresponding to desired speech and generate audio data representing the desired speech. Using the audio data, the system 100 may perform language processing to determine an action to perform that is responsive to the desired speech (e.g., voice command). For example, the voice command(s) may control the device 110, audio devices (e.g., play music over loudspeaker(s), capture audio using microphone(s), or the like), multimedia devices (e.g., play videos using a display, such as a television, computer, tablet or the like), smart home devices (e.g., change temperature controls, turn on/off lights, lock/unlock doors, etc.), and/or the like without departing from the disclosure.

In some examples, the device 110 may be configured to perform the language processing without departing from the disclosure. For example, the device 110 may send the output audio data to a language processing component associated with the device 110 and the language processing component may perform language processing using the output audio data to determine an action responsive to the voice command. To cause the action to be performed, the device 110 may perform the action itself, may send a command to other device(s) associated with the user profile, may send the command to the system component(s) 120, and/or the like without departing from the disclosure. The disclosure is not limited thereto, however, and in other examples the system component(s) 120 may be configured to perform the language processing and the device 110 may send output audio data associated with the selected sound source (e.g., selected SSL track) to the system component(s) 120 via the network(s) 199. For example, the system component(s) 120 may perform language processing using the output audio data to determine an action to be performed that is responsive to the voice command. The system component(s) 120 may cause the action to be performed by sending a command to the device 110 and/or other device(s) associated with a user profile.

As described above, the UED component 340 may receive a variety of inputs and derive features with which to perform user engagement detection and generate the user engagement decision data 345. For example, the UED architecture 300 illustrates an example in which the UED component 340 receives the processed audio data 315, the VAD/SNR data 325 (e.g., SNR value(s)), the spatial power data 332 (e.g., spatial power as a function of direction), and/or the direction data 335 (e.g., direction of the dominant sound source). The disclosure is not limited thereto, however, and in some examples the UED component 340 may receive additional inputs and/or features without departing from the disclosure. For example, the UED component 340 may receive and/or generate additional features associated with an environment associated with the device 110. To illustrate an example, the UED component 340 may receive and/or generate features associated with room information, such as a size of the room, a reflection or reverberation level associated with the room (e.g., reverberation time), a room impulse response (RIR), and/or the like, although the disclosure is not limited thereto. By knowing the room information, the device 110 may condition other features and/or determine an expected range or limits associated with variables.

Figure 4:
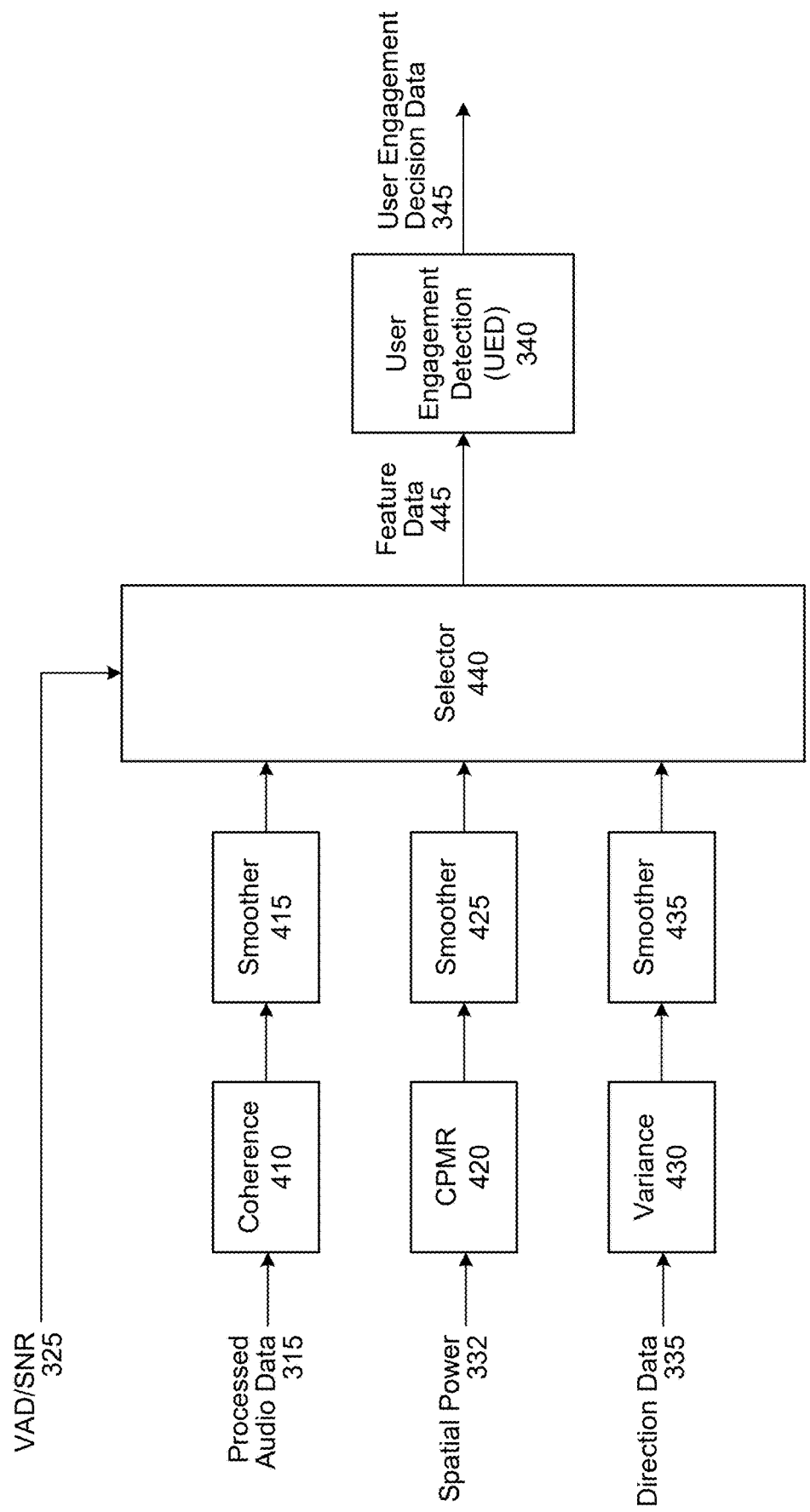
FIG. 4 is a block diagram illustrating an example of generating feature data for user engagement detection according to embodiments of the present disclosure.

FIG. 4 is a block diagram illustrating an example of generating feature data for user engagement detection according to embodiments of the present disclosure. In some examples, the device 110 may perform feature extraction 400 to derive features (e.g., feature vector(s)) that can be used by the UED component 340 to generate the user engagement decision data 345. In the example illustrated in FIG. 4, for example, the device 110 may perform feature extraction 400 to generate three sets of features that are effective for performing UED processing, which are based on cross-channel spectral characteristics, spatial power distribution, and direction data determined during SSL processing.

As illustrated in FIG. 4, the device 110 may perform feature extraction 400 using the processed audio data 315 to generate first feature data (e.g., first feature vector(s)) that correspond to cross-channel spectral characteristics. For example, a coherence component 410 may estimate a cross-channel spectral coherence between two channels of the processed audio data 315 on a frame-by-frame basis, which will be described in greater detail below with regard to FIGS. 8-10. After estimating the coherence and generating magnitude squared coherence (MSC) features, the coherence component 410 may output the MSC features to a smoother component 415 to generate the first feature data. For example, the smoother component 415 may perform time-based and/or power-based smoothing to yield a given feature, although the disclosure is not limited thereto.

Similarly, the device 110 may perform feature extraction 400 using the spatial power data 332 to generate second feature data (e.g., second feature vector(s)) that corresponds to the spatial power distribution. For example, a cell peak mean ratio (CPMR) component 420 may process the spatial power data 332 to generate CPMR features, which may be useful for head orientation estimation. The CPMR is defined as the ratio of the power of the cell with the highest power with respect to an average power of the rest of the cells, and additional details about generating the CPMR features will be described in greater detail below with regard to FIGS. 5-6. After generating the CPMR features, the CPMR component 420 may output the CPMR features to a smoother component 425 to generate the second feature data. For example, the smoother component 425 may perform time-based and/or power-based smoothing to yield a given feature, although the disclosure is not limited thereto.

Finally, the device 110 may perform feature extraction 400 using the direction data 335 to generate third feature data (e.g., third feature vector(s)) that corresponds to the direction data generated during SSL processing. For example, a variance component 430 may process the direction data 335 to generate distance variance features, which reflects the spatial stationarity of the sound source. Additional details about generating the distance variance features will be described in greater detail below with regard to FIG. 7. After generating the distance variance features, the variance component 430 may output the distance variance features to a smoother component 435 to generate the third feature data. For example, the smoother component 435 may perform time-based and/or power-based smoothing to yield a given feature, although the disclosure is not limited thereto.

In the example illustrated in FIG. 4, the device 110 performs feature extraction 400 using several separate smoother components 415/425/435. For example, the first smoother component 415 is configured to generate the first feature data based on MSC features, the second smoother component 425 is configured to generate the second feature data based on the CPMR features, and the third smoother component 435 is configured to generate the third feature data based on the direction variance features. While each of the smoother components 415/425/435 are configured to perform smoothing to generate corresponding feature data, they are not identical and the smoothing processing being performed may vary between the respective components without departing from the disclosure. For example, each smoother component 415/425/435 may be associated with unique parameters, such that a type and/or amount of smoothing may vary between the respective components.

In some examples, the features may be time-smoothed, and only features associated with high-SNR frames are included in the feature data. However, both time-based and power-based smoothing may be applied to yield a given feature without departing from the disclosure. In a time-based approach, the device 110 may rely on the parameters collected for a number of frames and compute a mean (e.g., plain average) or weighted mean (e.g., power-weighted average), although the disclosure is not limited thereto. Additionally or alternatively, in a power-based approach the device 110 may use the power of an audio frame or the power associated with an individual frequency bin to determine a weighted mean (e.g., power-weighted average). A duration of the time-interval used to find the mean determines how fast the UED component 340 responds to change. In addition, by including power in the smoothing process, the device 110 may place higher priority to higher-power events, while downplaying or ignoring weaker events (e.g., lower-power events).

As described above, the VAD/SNR data 325 may mark time intervals of active speech and may include some form of SNR value(s) corresponding to the active speech. In some examples, the UED component 340 may only perform UED processing when (i) the processed audio data 315 corresponds to the time intervals of active speech (e.g., speech is detected in the processed audio data 315) and (ii) SNR value(s) associated with the time intervals exceed a threshold value. An example of this selective processing is illustrated in FIG. 4 by a selector component 440, which is configured to generate feature data 445 based on the VAD/SNR data 325. For example, the selector component 440 may continuously receive the three sets of feature data generated during feature extraction 400, but may only generate the feature data 445 when the VAD/SNR data 325 indicates that the conditions are satisfied. Thus, the selector component 440 may selectively process portions of the feature data that are associated with (i) active speech and (ii) reduced noise and interference (e.g., high SNR value(s)), which improves an accuracy and/or reliability of the user engagement decision.

In some examples, the selector component 440 may be configured to combine feature data for a first number of audio frames. For example, the selector component 440 may concatenate feature data for three consecutive frames each time that the UED component 340 needs to generate the user engagement decision data 345. Thus, if the selector component 440 determines that the VAD/SNR data 325 satisfies the condition(s), the selector component 440 may retrieve feature data associated with a current audio frame as well as two previous audio frames in order to generate the feature data 445.

To illustrate an example, if the selector component 440 receives three sets of feature data, the selector component 440 may generate the feature data 445 as a nine-dimensional (9D) feature vector that includes the three most recent feature vectors for each of the three sets of feature data (e.g., three concatenated feature vectors corresponding to the coherence 410, three concatenated feature vectors corresponding to the CPMR 420, and three concatenated feature vectors corresponding to the variance 430). Thus, the UED component 340 is configured to make a UED decision for an individual audio frame (e.g., 8 ms of audio) based on feature data 445 that corresponds to a current audio frame as well as the prior two audio frames. The disclosure is not limited thereto, however, and a number of separate features and/or a length of history (e.g., number of previous audio frames) may vary without departing from the disclosure.

While FIG. 4 illustrates an example in which the device 110 performs feature extraction 400 to generate three sets of feature data, the disclosure is not limited thereto. In some examples, the feature data 445 may include additional inputs and/or features without departing from the disclosure. For example, the UED component 340 may receive additional features associated with room information, such as a size of the room, a reflection or reverberation level associated with the room (e.g., reverberation time), a room impulse response (RIR), and/or the like, although the disclosure is not limited thereto. By knowing the room information, the device 110 may condition other features and/or determine an expected range or limits associated with variables.

As illustrated in FIG. 4, the selector component 440 may output the feature data 445 to the UED component 340 and the UED component 340 may use the feature data 445 to generate the user engagement decision data 345. For example, the feature data may be input to a classifier that is trained to recognize patterns related to positive and negative user engagement. An output of the classifier may represent a user engagement decision, and popular choices for classifier design include neural networks and Gaussian mixture models. In some examples, the classifier may be trained using labeled data, where a feature vector is associated with a label having binary value indicating whether a user is engaged (e.g., 1) or not engaged (e.g., 0), although the disclosure is not limited thereto. Additionally or alternatively, in some examples the UED component 340 may be configured to generate a coarse estimate of head orientation associated with the user's head, which may be output to downstream components to provide additional functionality.

Various machine learning techniques may be used to train and operate models to perform various steps described herein, such as user recognition, sentiment detection, image processing, dialog management, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, Ada-Boost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 5:
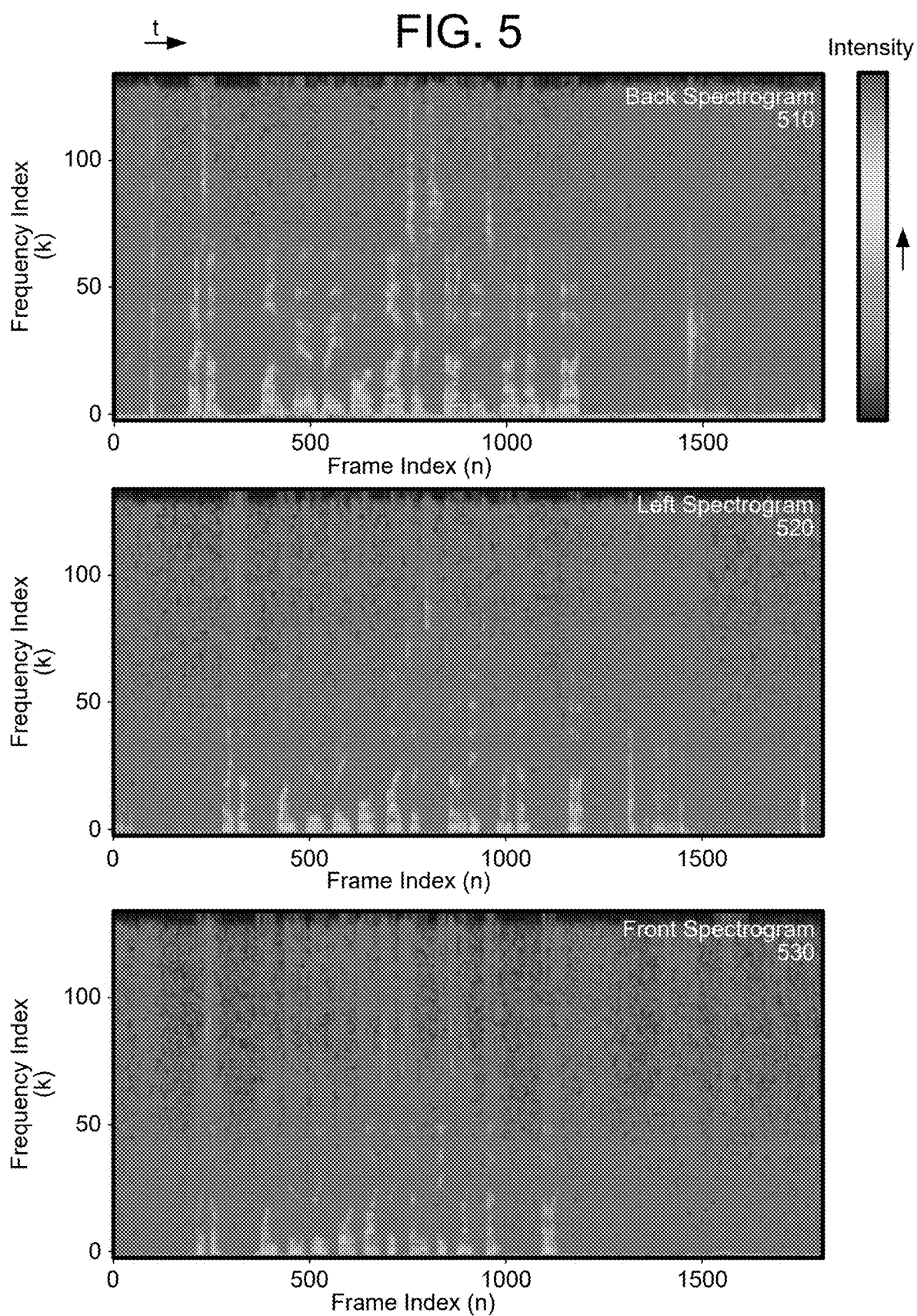
FIG. 5 illustrates examples of spectrogram data for a variety of head orientations according to embodiments of the present disclosure.

FIG. 5 illustrates examples of spectrogram data for a variety of head orientations according to embodiments of the present disclosure. To illustrate some of the features used by the UED component 340, several speech samples were obtained for a male subject located one meter away from the device 110. As illustrated in FIG. 5, spectrogram plots are shown for three different head orientations, with a vertical axis representing a frequency index from 0 to 128 (e.g., 0 to 8 kHz) and a horizontal axis representing a frame index with each audio frame corresponding to 128 samples (e.g., 8 ms). For example, back spectrogram chart 510 corresponds to a first head orientation (e.g., 180°) in which the subject is facing away from the device 110, left spectrogram chart 520 corresponds to a second head orientation (e.g., 90°) in which the subject is facing to the left, perpendicular to the device 110, and front spectrogram chart 530 corresponds to a third head orientation (e.g., 0°) in which the subject is directly facing the device 110.

Of the three different head orientations, the third head orientation (e.g., 0°) corresponds to the most intelligible speech, as all frequency components are preserved faithfully. In contrast, the first head orientation (e.g., 180°) results in sounds tending to be muzzled and reverberant, as high frequency components do not reach the microphones direction, but through multiple reflections. The second head orientation (e.g., 90°) is somewhere in the middle between the two. As illustrated in FIG. 5, the spectrograms reflect this dynamic, as the front spectrogram chart 530 represents the strongest signal, with a clear structure in the high frequency region.

As described above, in some examples the SSL component 330 may calculate steered response power (SRP) using the multi-channel processed audio data 315. For example, the SSL component 330 may generate the spatial power data 332 by calculating a set of power values as a function of direction (e.g., spatial power). In addition, the SSL component 330 may find a direction of a largest power peak represented in the spatial power data 332 for each audio frame (e.g., every 8 ms) and may include corresponding direction information in the direction data 335. For example, the SSL component 330 may determine an azimuth and elevation corresponding to the largest power peak represented in the spatial power data 332, although the disclosure is not limited thereto.

The device 110 may calculate the steered response power such that power values are calculated for available direction vectors stored in a codebook. For example, the device 110 may determine the steered response power using a delay-direction codebook in order to calculate power as a function of direction. For ease of use, the direction vectors may be assigned to a set of rectangular location cells surrounding the device 110, and the device 110 may perform SSL processing by selecting a location cell associated with the largest power value. For example, the device 110 may use the delay-direction codebook to calculate the power values and may then use the power values to estimate a direction associated with the sound source.

The codebook may consist of a collection of delay vectors (e.g., TDOA vectors) together with location vectors, and the codebook may be determined based on the locations of the microphones and the physical dimensions or shape of an enclosure of the device 110. The location vectors may be represented as either spherical coordinates (e.g., azimuth θ and elevation Φ) and/or rectangular coordinates (e.g., three components in the x, y, and z axes, with the resultant vector having unit length), and the device 110 may convert from one representation to the other without departing from the disclosure.

The delay-location codebook for SRP location consists of $$\{a_m, t_m\}, m=0 \text{ to } M-1 \quad [1]$$

where $a_m$ denotes the 3D location vectors, $t_m$ denotes the time-differential of arrival (TDOA) vectors, and M is the codebook size. Each TDOA vector contains time delays measured between two microphones.

In some examples, the device 110 may perform codebook generation to generate an initial codebook and then reduce a number of delay vectors to generate a final codebook. For example, the device 110 may generate a first set of $M_0$ candidate location vectors (e.g., $a_m$, where m=0 to $M_0-1$) and the initial codebook may include each of the $M_0$ candidate location vectors. Thus, the initial codebook may represent all potential directions of sound sources (e.g., depending on a desired resolution) with respect to the microphone array and/or the device 110. In contrast, the final codebook may include a second set of $M_1$ candidate location vectors (e.g., $a_m$, where m=0 to $M_1-1$) that corresponds to a subset of the potential directions of sound sources, as described in greater detail below.

The number of candidate location vectors (e.g., $M_0$) may vary depending on a desired resolution associated with the codebook and/or the device 110. For example, if the device 110 includes a small number of microphones, an individual TDOA value may correspond to a large range of directions, so the device 110 may generate the codebook using a lower resolution. In contrast, if the device 110 includes a large number of microphones, the TDOA values may correspond to a small range of directions, so the device 110 may generate the codebook using a higher resolution to take advantage of the increased precision offered by the large number of microphones.

In some examples, the device 110 may generate the candidate location vectors based on an elevation increment, an azimuth range, an elevation range, and/or a distance value (e.g., radius), although the disclosure is not limited thereto. While the system 100 may generate the candidate location vectors using a variety of techniques without departing from the disclosure, SSL processing may be improved if the candidate location vectors are near-uniformly distributed for the entire sphere: θ∈[−π, π] and φ∈[0, π]. Thus, each candidate location vector may be specified by spherical coordinates {r, θ, φ}, which can also be converted to rectangular coordinates {x, y, z}.

The microphone array may include K microphones, with known locations given by:

$$u_n = \begin{bmatrix} x_n \\ y_n \\ z_n \end{bmatrix}, n = 0 \text{ to } K-1 \quad [2]$$

where $u_n$ indicates three-dimensional (3D) coordinates of the nth microphone, which are expressed in some unit of distance (e.g., meter). Depending on the microphone locations, and the direction-of-arrival of a given sound, said sound reaches different microphones at different times. By measuring the TDOA caused by the sound, it is possible to estimate the direction-of-arrival. For example, there are a total of:

$$P = \binom{K}{2} = \frac{K(K-1)}{2} \quad [3]$$

microphone pairs for which the device 110 must calculate delay values in order to accurately estimate the direction-of-arrival. Thus, each TDOA vector may include P elements, which is the number of microphone pairs with K as the number of microphones.

Table 1 shows an example of microphone indices for the case of K=4. For example, a first microphone pair may include Mic0 and Mic1, a second microphone pair may include Mic0 and Mic2, and so on.

TABLE 1

The indices for microphone pairs when K = 4.

| k | index0 | index1 |
|---|--------|--------|
| 0 | 0 | 1 |
| 1 | 0 | 2 |
| 2 | 0 | 3 |
| 3 | 1 | 2 |
| 4 | 1 | 3 |
| 5 | 2 | 3 |

In order to estimate the direction-of-arrival, the device 110 may find a TDOA vector for each location vector. To find the TDOA vector, the device 110 may calculate the location difference vectors using:

$$d_k = u_{index1[k]} - u_{index0[k]}, k=0 \text{ to } P-1 \quad [4]$$

where $d_k$ denotes the location difference vector for an individual microphone pair, which is a 3D vector with the three elements of the vector representing distance quantities.

Given the candidate location vectors (e.g., $a_m$) and the location difference vectors $d_k$ described above, the device 110 may determine elements of the TDOA vectors, as shown below:

$$\tau_{m,k} = a_m^T d_k / c \quad [5]$$

where $\tau_{m,k}$ denotes a time delay, the candidate location vectors $a_m$ are unit-length 3D vectors representing a direction in rectangular coordinates, and c is the speed of sound (e.g., 343 m/s).

The resulting time delay $\tau_{m,k}$ is a real number (or floating-point number) that may be negative or positive, measured in seconds. Thus, the device 110 may convert the time delay $\tau_{m,k}$ to a positive integer in the range of [0, intFactor·N−1], with intFactor a positive integer interpolation factor, and N the length of discrete Fourier transform (DFT) used. Typically DFT is used in cross-correlation calculation. The conversion is done with $$t = \text{modulo}(\text{round}(\tau \cdot fs \cdot \text{intFactor}), \text{intFactor} \cdot N) \quad [6]$$

where fs is a sampling frequency measured in Hertz (Hz), and round(x) is a function that rounds x to the nearest integer. Given |x|<N, then:

$$\text{mod } ulo(x, N) = \begin{cases} x, & \text{if } x \geq 0 \\ x + N, & \text{otherwise} \end{cases} \quad [7]$$

The device 110 may calculate (330) the TDOA vectors as:

$$t_m = \begin{bmatrix} t_{m,0} \\ t_{m,1} \\ \vdots \\ t_{m,P-1} \end{bmatrix}, m = 0 \text{ to } M - 1 \quad [8]$$

where $t_m$ denotes a TDOA vector containing P elements (k=0 to P−1), where the kth element ($t_{m,k}$) contains the time delay between the microphones at index0[k] and index1[k] having values in the range of [0, intFactor·N−1], with N equal to the DFT length used in cross-correlation calculation.

As illustrated in FIG. 4 and described above, the device 110 may perform feature extraction 400 to generate second feature data from the spatial power data 332. For example, the CPMR component 420 may generate the CPMR features by calculating a cell peak mean ratio (CPMR), which is defined as the ratio of the power of the location cell with the highest power with respect to an average power of the rest of the location cells. The CPMR value represents a form of direct to reverberant ratio (DRR), with the direct power given by the highest power value of the location cells, while the rest of the location cells provide the power of reverberant components (e.g., excluding the location cell with the highest power value). For example, the CPMR component 420 may calculate a CPMR value by (i) determining that a first power value is a highest value of a first series of power values (e.g., spatial power data 332), (ii) determining an average power value by calculating a mean of the remaining power values (e.g., average value of the first series of power values, excluding the first power value), and (iii) determining a ratio of the first power value with respect to the average power value. The CPMR value should be highest when a head orientation is close to zero degrees and lower for other head orientation angles.

Figure 6:
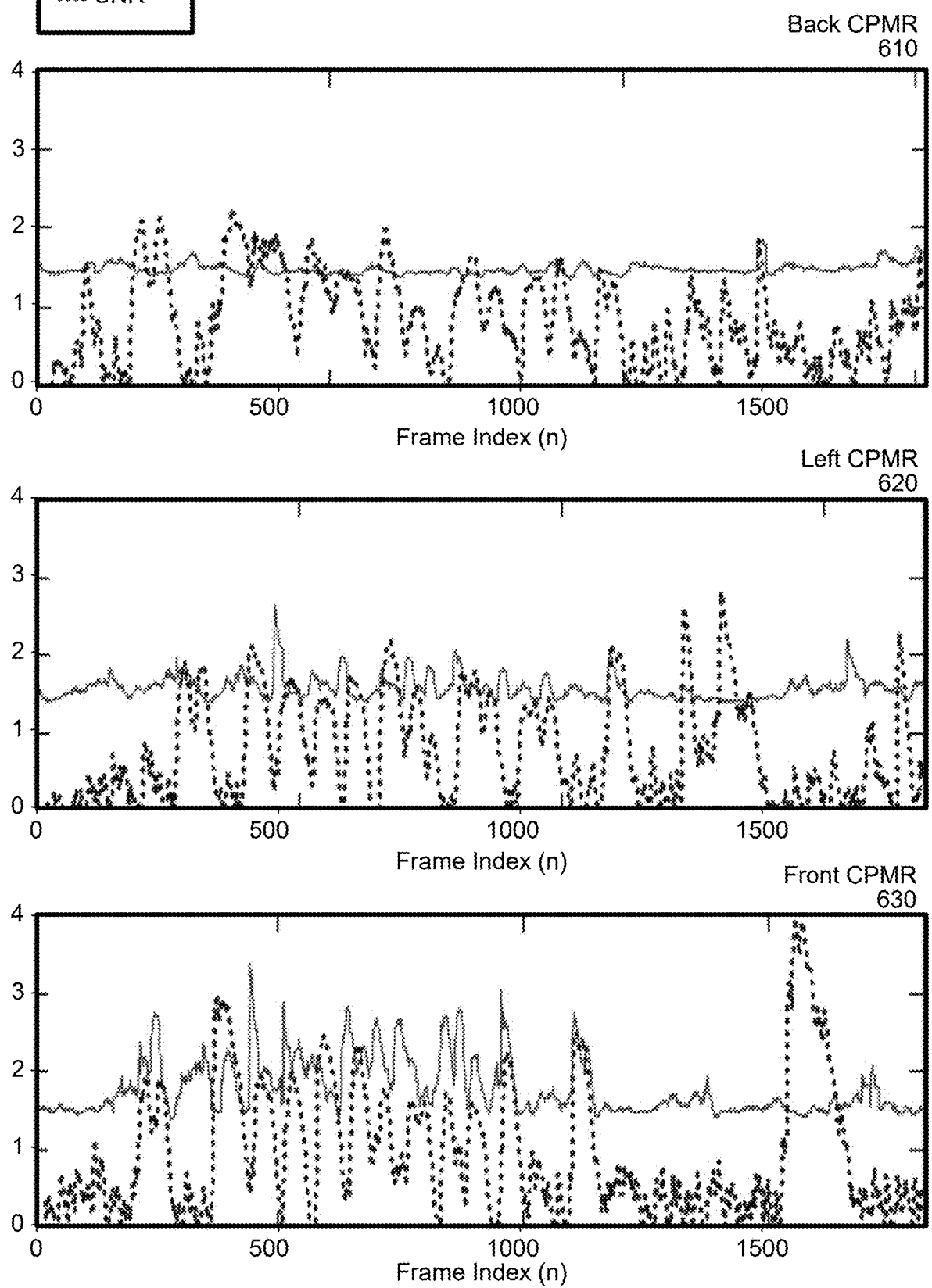
FIG. 6 illustrates examples of spatial power feature data for a variety of head orientations according to embodiments of the present disclosure.

FIG. 6 illustrates examples of spatial power feature data for a variety of head orientations according to embodiments of the present disclosure. As illustrated in FIG. 6, CPMR plots are shown for three different head orientations, with a vertical axis representing ratio values from 0 to 4 and a horizontal axis representing a frame index with each audio frame corresponding to 128 samples (e.g., 8 ms). For example, back CPMR chart 610 corresponds to a first head orientation (e.g., 180°) in which the subject is facing away from the device 110, left CPMR chart 620 corresponds to a second head orientation (e.g., 90°) in which the subject is facing to the left, perpendicular to the device 110, and front CPMR chart 630 corresponds to a third head orientation (e.g., 0°) in which the subject is directly facing the device 110.

As illustrated in FIG. 6, each plot includes a continuous line representing CPMR values (e.g., weighted mean) over time, along with a dashed line representing a corresponding SNR value (e.g., measured in dB and scaled by 0.1). As illustrated, the CPMR values are highest for the front CPMR chart 630, followed by the left CPMR chart 620, with the back CPMR chart 610 being the lowest. For example, first CPMR values represented in the back CPMR chart 610 tend to stay near 1.5, with small variations despite changes in speech power. In contrast, third CPMR values represented in the front CPMR chart 630 show the largest variation, with CPMR values reaching 3.0 for certain speech segments. Finally, second CPMR values represented in the left CPMR chart 620 are again in the middle, with some variations that are stronger than the first CPMR values but not as strong as the third CPMR values. Note that only the highest CPMR values matter, in this exercise, as the lower CPMR values remain similar across all three due to the SNR being low.

Figure 7:
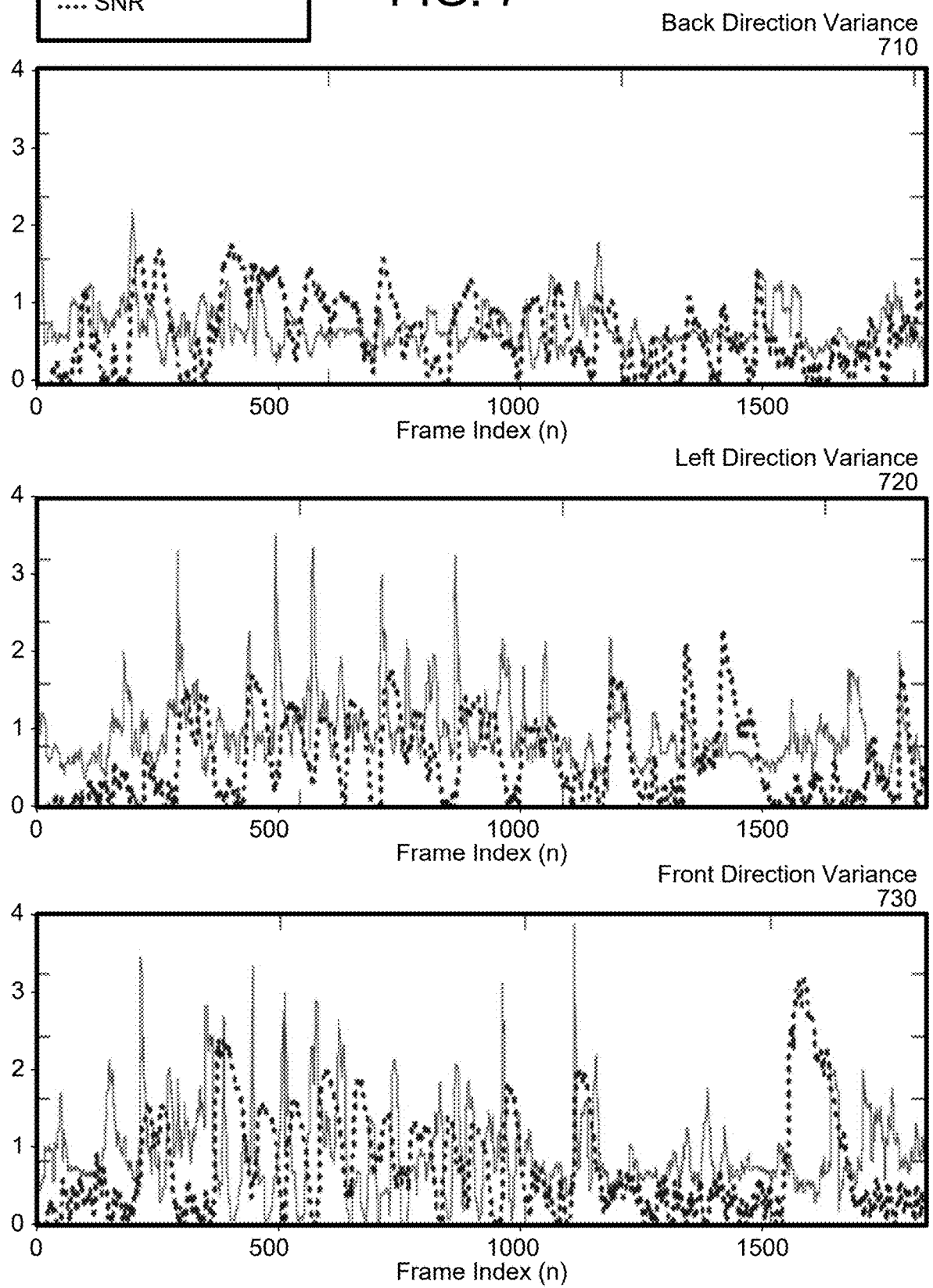
FIG. 7 illustrates examples of direction variance feature data for a variety of head orientations according to embodiments of the present disclosure.

FIG. 7 illustrates examples of direction variance feature data for a variety of head orientations according to embodiments of the present disclosure. As illustrated in FIG. 7, direction variance plots are shown for three different head orientations, with a vertical axis representing a direction variance from 0 to 1.0 and a horizontal axis representing a frame index with each audio frame corresponding to 128 samples (e.g., 8 ms). For example, back direction variance chart 710 corresponds to a first head orientation (e.g., 180°) in which the subject is facing away from the device 110, left direction variance chart 720 corresponds to a second head orientation (e.g., 90°) in which the subject is facing to the left, perpendicular to the device 110, and front direction variance chart 730 corresponds to a third head orientation (e.g., 0°) in which the subject is directly facing the device 110.

As illustrated in FIG. 7, each plot includes a continuous line representing direction variance values (e.g., weighted mean) over time, along with a dashed line representing a corresponding SNR value (e.g., measured in dB and scaled by 0.1). As mentioned above, the direction variance reflects a spatial stationarity of the source. As illustrated, first direction variance values represented in the back direction variance chart 710 are relatively constant without much variation, remaining near a mean value of 0.2. Similarly, second direction variance values represented in the left direction variance chart 720 correspond to large spikes followed by drops to near 0.2. In contrast, third direction variance values represented in the front direction variance chart 730 correspond to large spikes followed by drops to near zero (e.g., 0.0). Note that only the lowest direction variance values matter, in this exercise, as the higher direction variance values correspond to noisy conditions in which the SNR is high (e.g., large error in direction estimates).

For the back direction variance chart 710, the SRP algorithm has difficulty finding a power peak, resulting in the distance variance tending to be high (e.g., near an average of 0.2), since an estimated direction is not that consistent frame-to-frame.

For the left direction variance chart 720, there is a large spike in variance at the onset of speech, likely caused by a short interval of identifying a new direction, but the variance quickly goes back to the average of 0.2. Basically, the signal strength is not strong enough for the SRP algorithm to identify a stationary power peak.

For the front direction variance chart 730, there is a spike in variance at the onset of speech, followed by an interval of near zero variance. This is because the SRP algorithm is able to identify the location of the power peak and remain locked to that location during active speech. Thus, the spikes are caused by noisy conditions when SNR is low and/or speech is not present, while the low variance values are caused by the SRP algorithm accurately tracking a direction of the user during active speech.

In accordance with one or more implementations, direction information given by azimuth/elevation (e.g. direction information from sound source localization) are converted to rectangular coordinates in a coordinate system in the form of (x, y, z), e.g., with the device at the origin. In accordance with one or more implementations, for all of the cell data for a frame of audio data, a power-weighted x/y/z mean are found representing the mean direction. In accordance with one or more implementations, this is accomplished by: multiplying, for each respective cell, a determined x-axis coordinate value by a power value for that respective cell to produce a power-weighted x-axis value, and adding together all of the resultant power-weighted x-axis values (e.g. by looping through all of the cells and adding each respective determined power-weighted x-axis value during a run through the loop to a variable initialized to zero prior to the loop beginning) to produce a power-weighted x-axis sum value. This is repeated for y-axis and z-axis values. The determined power-weighted x-axis, y-axis, and z-axis sum values are utilized to generate a unit vector, e.g. a vector determined by these values is normalized to produce a unit vector. This unit vector is then used as a mean direction.

In accordance with one or more implementations, direction variance is found as the power-weighted direction difference (norm of the x/y/z vector subtracted from its mean).

In accordance with one or more implementations, an approach involves subtracting, for each respective cell, the mean direction unit vector from a respective vector formed using the x,y,z coordinates for that cell (or a respective unit vector determined by normalizing a respective vector formed using the x,y,z coordinates for that cell) to produce a respective cell difference vector, determining a respective length of the respective cell difference vector, and then multiplying that respective cell length by the power value for the respective cell to produce a respective power-weighted direction variance contribution value for that respective cell. The respective power-weighted direction variance contribution values for all of the cells are added together (e.g. during a loop using a variable initialized to zero) and the resultant sum is divided by a sum of the powers of all the respective cells (e.g., determined during the same loop using a different variable initialized to zero) to produce a direction variance value.

Figure 8:
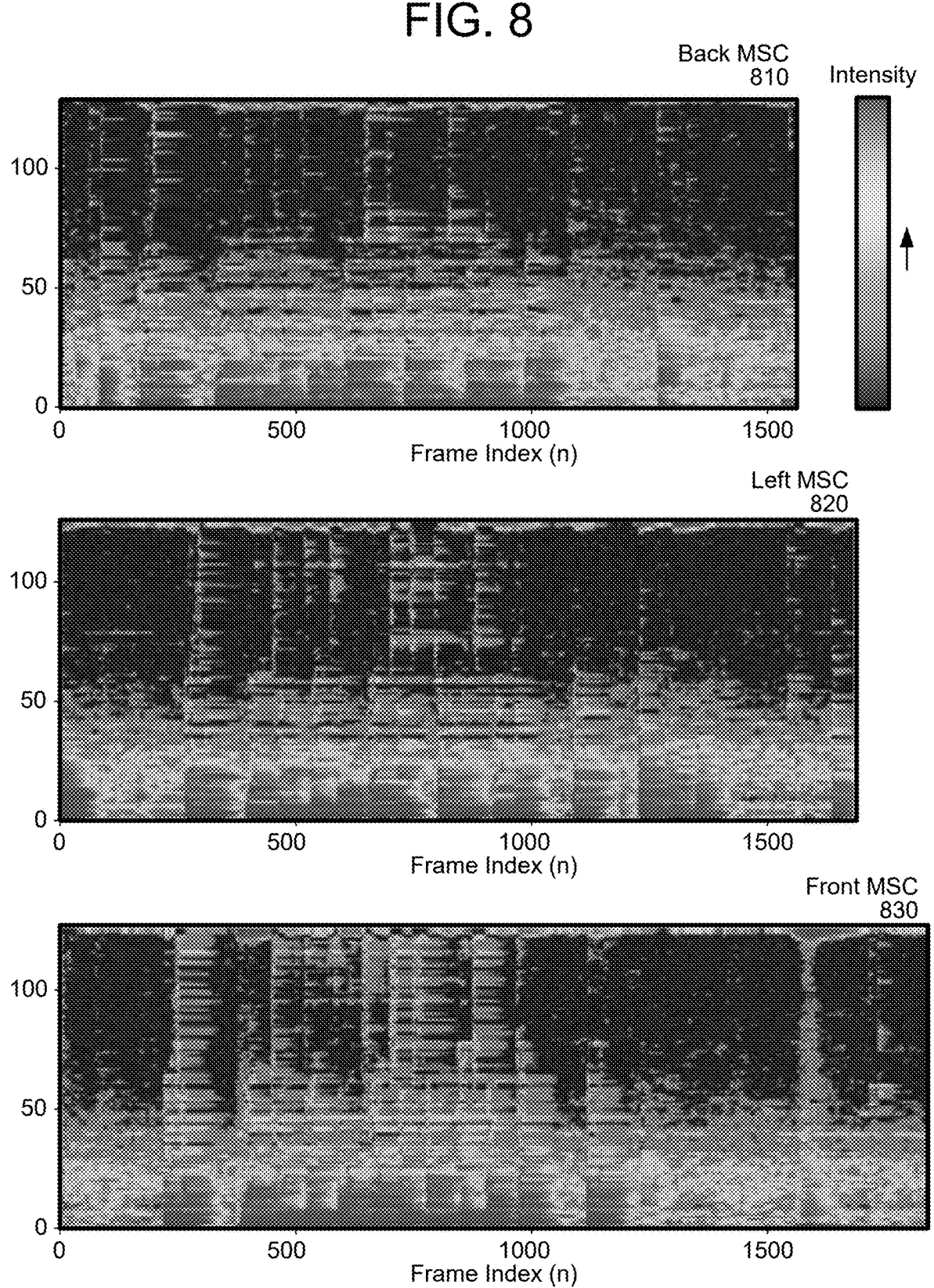
FIG. 8 illustrates examples of coherence feature data for a variety of head orientations according to embodiments of the present disclosure.

FIG. 8 illustrates examples of coherence feature data for a variety of head orientations according to embodiments of the present disclosure. As will be described in greater detail below, the device 110 may determine a coherence between individual channels of the processed audio data 315, which can be referred to as magnitude squared coherence (MSC). As illustrated in FIG. 8, plots are shown for three different head orientations, with a vertical axis representing a frequency index from 0 to 128 (e.g., 0 to 8 kHz), a horizontal axis representing a frame index with each audio frame corresponding to 128 samples (e.g., 8 ms), and a range of colors between black and white representing an intensity of the MSC value itself. For example, back MSC chart 810 corresponds to a first head orientation (e.g., 180°) in which the subject is facing away from the device 110, left MSC chart 820 corresponds to a second head orientation (e.g., 90°) in which the subject is facing to the left, perpendicular to the device 110, and front MSC chart 830 corresponds to a third head orientation (e.g., 0°) in which the subject is directly facing the device 110.

In some examples, the device 110 may map signals from two or more microphones to a subband domain using analysis filterbanks. For example, a first analysis filterbank may convert a first microphone signal $z_0(n)$ in a time domain to a first microphone signal $Z_0(n,k)$ in a subband domain, while a second analysis filterbank may convert a second microphone signal $z_1(n)$ in the time domain to a second microphone signal $Z_1(n,k)$ in the subband domain, where n is the frame index, k=0 to N/2 is the frequency index, and N is the number of subbands. For example, the analysis filterbanks may include a uniform discrete Fourier transform (DFT) filterbank to convert the microphone signal z(n) from the time domain into the sub-band domain (e.g., converting to the frequency domain and then separating different frequency ranges into a plurality of individual sub-bands). Therefore, the audio signal Z may incorporate audio signals corresponding to multiple different microphones as well as different sub-bands (i.e., frequency ranges) as well as different frame indices (i.e., time ranges). Thus, the audio signal from the mth microphone may be represented as $X_m(n, k)$, where n denotes the frame index and k denotes the sub-band index.

To generate the first feature data, the device 110 may use a first microphone signal $Z_0(n,k)$ and a second microphone signal $Z_1(n,k)$ to estimate a coherence in each frequency index (e.g., frequency bin or subband). For example, the device 110 may perform power spectral density (PSD) estimation, such as using the first microphone signal $Z_0(n,k)$ to generate a first PSD estimate and using the second microphone signal $Z_1(n,k)$ to generate a second PSD estimate. The device 110 may generate the PSD estimates using the following equation:

$$S_{x_i}[n,k]=(1-\lambda)S_{x_i}[n-1,k]+\lambda \cdot |X_i[m,k]|^2, i=0,1, k=0 \text{ to } N/2 \qquad [9]$$

where $\lambda \in (0, 1)$ denotes a forgetting factor and i is the microphone index.

Using the first PSD estimate and the second PSD estimate, the device 110 may calculate a cross-PSD estimate using the following equation:

$$S_{x_0 x_1}[n,k]=(1-\lambda)S_{x_0 x_1}[n-1,k]+\lambda \cdot X_0[m,k]X_1^*[m,k] \qquad [10]$$

Using the first PSD estimate, the second PSD estimate, and the cross-PSD estimate, the device 110 may determine a coherence estimate using the equation below:

$$\Gamma_x[m, k] = \frac{S_{x_0 x_1}[m, k]}{\sqrt{S_{x_0}[m, k]S_{x_1}[m, k]}}, k = 0 \text{ to } N/2 \qquad [11]$$

Where m is the frame index, k is the frequency index, $S_{x_0 x_1}[m, k]$ is the cross-PSD estimate, $S_{x_0}$ is the first PSD estimate, and $S_{x_1}$ is the second PSD estimate. The magnitude squared coherence (MSC) is the squared of the magnitude of the coherence, which is limited to the range [0, 1]. For signals that are highly coherent or in-phase, an MSC value may approach 1.0, whereas an MSC value may be low (e.g., near zero) for signals that are less coherent, such as those that reach the microphones through multiple reflections.

In some examples, the device 110 may generate the coherence estimate using only two microphone channels associated with the device 110. For example, the device 110 may select the two best microphone channels to calculate the PSD estimates and/or the coherence estimate. Additionally or alternatively, the device 110 may be configured to use two fixed microphone channels each time without departing from the disclosure. The disclosure is not limited thereto, however, and in other examples the device 110 may generate one or more coherence estimates using three or more microphone channels without departing from the disclosure. For example, the device 110 may select four pairs of microphones and calculate a coherence estimate for each pair of microphones (e.g., generate four coherence estimates). In some examples, the device 110 may determine the four coherence estimates and then calculate a combined coherence estimate using the four coherence estimates, such as by calculating an average of the four coherence estimates. In other examples, however, the device 110 may determine the four coherence estimates and input all four coherence estimates to the UED component 340 without departing from the disclosure.

In some examples, the device 110 may be configured to select multiple pairs of microphones each time based on a fixed configuration. For example, the system 100 may experimentally determine which pairs of microphones provide the best accuracy, and the device 110 may be configured to select fixed pairs based on the microphone geometry. In other examples, however, the device 110 may be configured to dynamically select multiple pairs of microphones without departing from the disclosure. For example, the device 110 may identify which microphone pairs to select at runtime, based on signal quality metrics and/or other information associated with the microphone channels.

As illustrated in FIG. 8, the head orientation does not matter for low frequency components, as MSC values will be high as these signals reach the microphones almost directly. For high frequency components, however, the signals reach the microphones directly only if the subject is facing the microphone array, otherwise there will be a drop in coherence as the signals reach the microphone array via multiple reflections or become diffuse. Thus, at lower frequencies (e.g., frequency indexes below 20, which corresponds to 1.25 kHz and below), all three MSC plots have relatively high MSC values, but the front MSC chart 830 has much higher MSC values for higher frequencies (e.g., frequency indexes above 75, which corresponds to a range from 4.7 kHz to 6.9 kHz)

Figure 9:
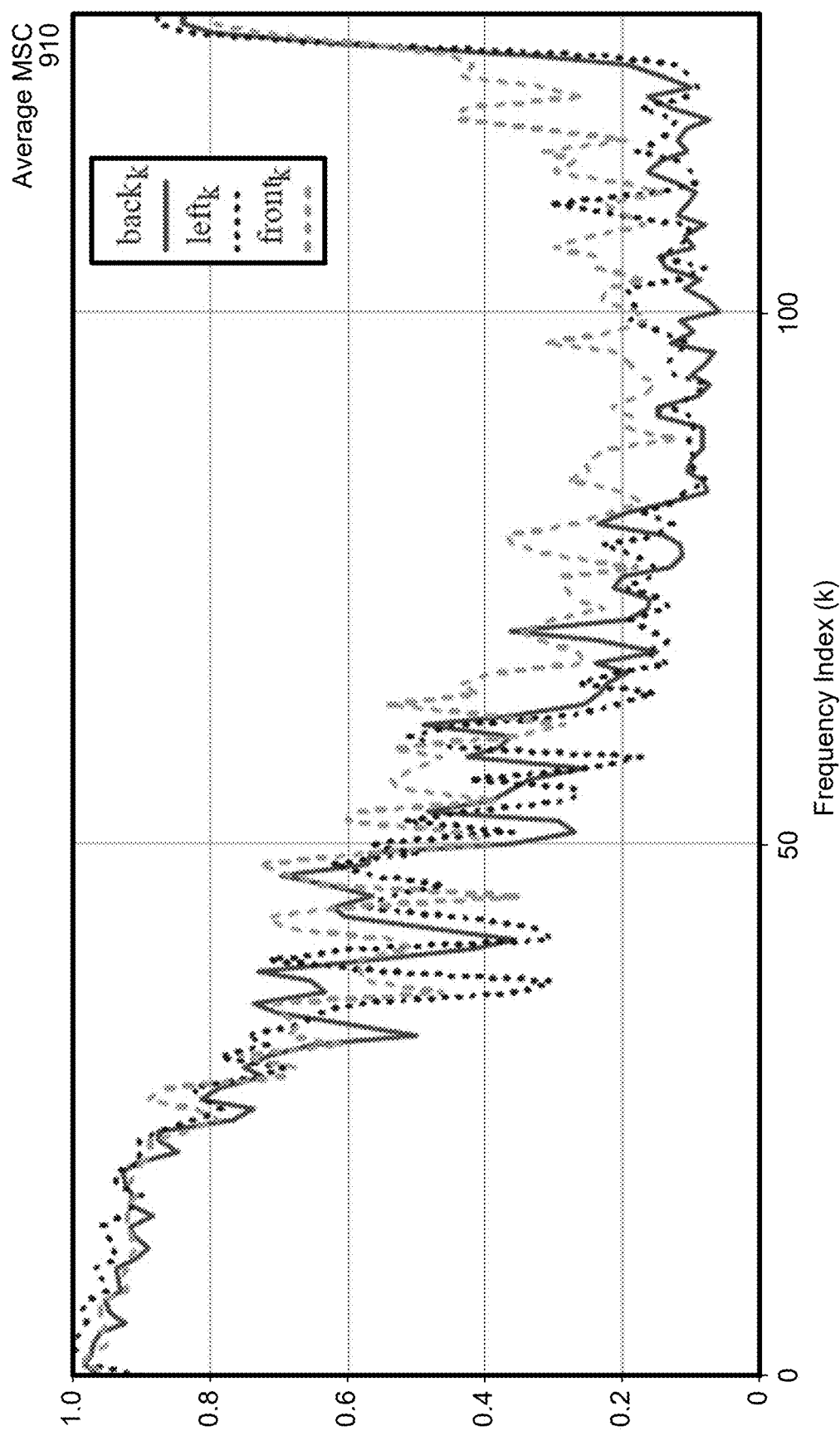
FIG. 9 illustrates examples of averaged coherence feature data for a variety of head orientations according to embodiments of the present disclosure.

FIG. 9 illustrates examples of averaged coherence feature data for a variety of head orientations according to embodiments of the present disclosure. As illustrated in FIG. 9, average MSC values for three different head orientations are shown in a single plot (e.g., average MSC chart 910), with a vertical axis representing a MSC value (e.g., between 0.0 and 1.0) and a horizontal axis representing a frequency index k. As represented in the average MSC chart 910, average MSC values are significantly lower at higher frequencies when the user is in the first head orientation (e.g., 180°) and the second head orientation (e.g., 90°), while the third head orientation (e.g., 0°) corresponds to the highest MSC values.

Figure 10:
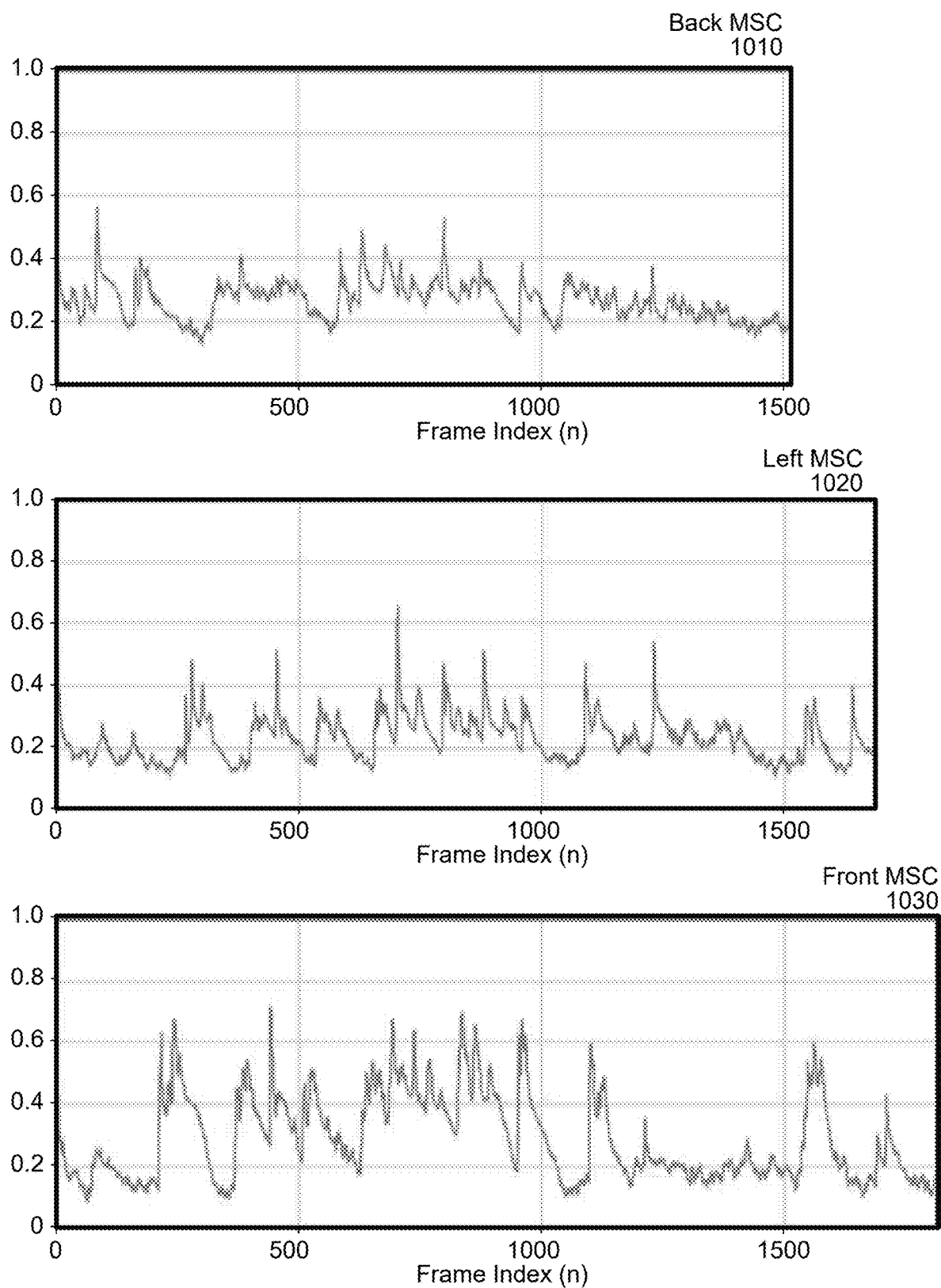
FIG. 10 illustrates examples of coherence feature data for a variety of head orientations according to embodiments of the present disclosure.

FIG. 10 illustrates examples of coherence feature data for a variety of head orientations according to embodiments of the present disclosure. As illustrated in FIG. 10, plots are shown for three different head orientations, with a vertical axis representing a MSC value (e.g., between 0.0 and 1.0) for a frequency range (e.g., 4.7 kHz to 6.9 kHz) and a horizontal axis representing a frame index, with each audio frame corresponding to 128 samples (e.g., 8 ms). For example, back MSC chart 1010 corresponds to a first head orientation (e.g., 180°) in which the subject is facing away from the device 110, left MSC chart 1020 corresponds to a second head orientation (e.g., 90°) in which the subject is facing to the left, perpendicular to the device 110, and front MSC chart 1030 corresponds to a third head orientation (e.g., 0°) in which the subject is directly facing the device 110. As represented in FIG. 10, the MSC values are significantly lower at higher frequencies when the user is in the first head orientation (e.g., 180°) and the second head orientation (e.g., 90°), while the third head orientation (e.g., 0°) corresponds to the highest MSC values.

In some examples, the device 110 may use the UED decision data 345 generated by the UED component 340 as part of a larger user engagement detection processing. To illustrate an example, a system directed input detector may use the UED decision data 345 in conjunction with image-based user engagement detection (e.g., computer vision decision) without departing from the disclosure. For example, the device 110 may use a camera to generate image data and may perform computer vision processing using the image data to determine whether a face is speaking and/or a user is engaged with the device 110.

By combining the image-based UED processing with the audio-based UED processing described above, the device 110 may improve an overall accuracy of the UED determination. To illustrate a simple example, a first user may be visible in the image data while a second user may be speaking but not visible. Thus, while the device 110 may detect a face represented in the image data, the UED decision data 345 may indicate that the person is not engaged with the device 110 and the device 110 may accurately ignore the speech.

Figure 11:
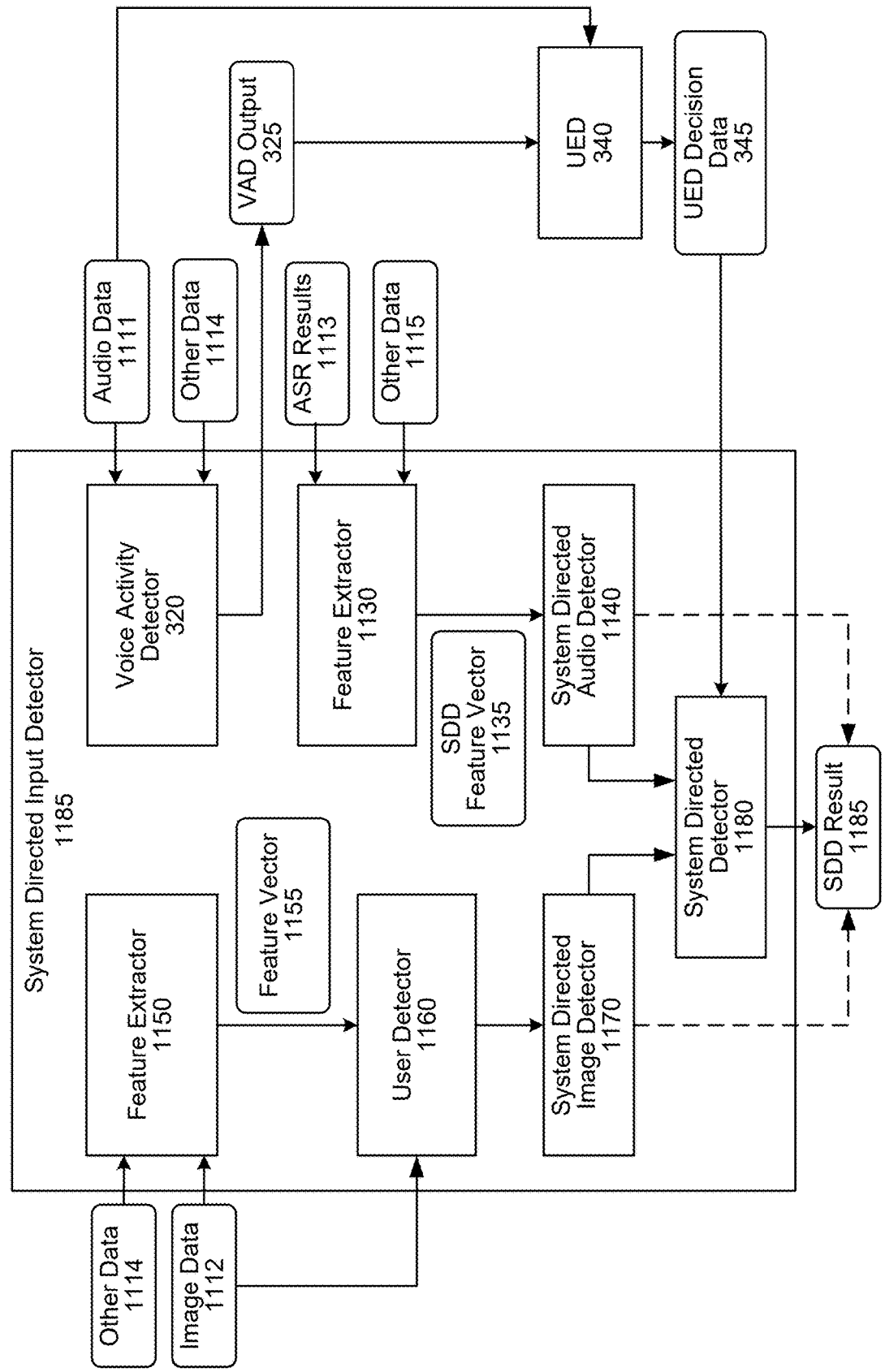
FIG. 11 is a conceptual diagram of components of a system to detect if input audio data includes system directed speech, according to embodiments of the present disclosure.

FIG. 11 is a conceptual diagram of components of a system to detect if input audio data includes system directed speech, according to embodiments of the present disclosure. As shown in FIG. 11, a system directed input detector 1185 may include a number of different components. First, the system directed input detector 1185 may include a voice activity detector (VAD) 320. The VAD 320 may operate to detect whether the incoming audio data 1111 includes speech or not. The VAD output 325 may be a binary indicator. Thus, if the incoming audio data 1111 includes speech, the VAD 320 may output an indicator 325 that the audio data 1111 does includes speech (e.g., a 1) and if the incoming audio data 1111 does not includes speech, the VAD 320 may output an indicator 325 that the audio data 1111 does not includes speech (e.g., a 0). The VAD output 325 may also be a score (e.g., a number between 0 and 1) corresponding to a likelihood that the audio data 1111 includes speech. The VAD 320 may also perform start-point detection as well as end-point detection where the VAD 320 determines when speech starts in the audio data 1111 and when it ends in the audio data 1111. Thus the VAD output 325 may also include indicators of a speech start point and/or a speech endpoint for use by other components of the system. (For example, the start-point and end-points may demarcate the audio data 1111 that is sent to the speech processing component.) The VAD output 325 may be associated with a same unique ID as the audio data 1111 for purposes of tracking system processing across various components.

The VAD 320 may operate using a variety of VAD techniques, including those described above with regard to VAD operations performed by device 110. The VAD may be configured to be robust to background noise so as to accurately detect when audio data actually includes speech or not. The VAD 320 may operate on raw audio data 1111 such as that sent by device 110 or may operate on feature vectors or other data representing the audio data 1111. For example, the VAD 320 may take the form of a deep neural network (DNN) and may operate on a single feature vector representing the entirety of audio data 1111 received from the device or may operate on multiple feature vectors, for example feature vectors representing frames of audio data where each frame covers a certain amount of time of audio data (e.g., 25 ms). The VAD 320 may also operate on other data 1114 that may be useful in detecting voice activity in the audio data 1111. For example, the other data 1114 may include results of anchored speech detection where the system takes a representation (such as a voice fingerprint, reference feature vector, etc.) of a reference section of speech (such as speech of a voice that uttered a previous command to the system that included a wakeword) and compares a voice detected in the audio data 1111 to determine if that voice matches a voice in the reference section of speech. If the voices match, that may be an indicator to the VAD 320 that speech was detected. If not, that may be an indicator to the VAD 320 that speech was not detected. (For example, a representation may be taken of voice data in the first input audio data which may then be compared to the second input audio data to see if the voices match. If they do (or do not) that information may be considered by the VAD 320.) The VAD 320 may also consider other data when determining if speech was detected. The VAD 320 may also consider speaker ID information (such as may be output by a user recognition component), directionality data that may indicate what direction (relative to the capture device 110) the incoming audio was received from. Such directionality data may be received from the device 110 and may have been determined by a beamformer or other component of device 110. The VAD 320 may also consider data regarding a previous utterance which may indicate whether the further audio data received by the system is likely to include speech. Other VAD techniques may also be used.

If the VAD output 325 indicates that no speech was detected the system 100 may discontinue processing with regard to the audio data 1111, thus saving computing resources that might otherwise have been spent on other processes (e.g., ASR for the audio data 1111, etc.). If the VAD output 325 indicates that speech was detected, the system 100 may make a determination as to whether the speech was or was not directed to the speech-processing system. Such a determination may be made by the system directed audio detector 1140. The system directed audio detector 1140 may include a trained model, such as a DNN, that operates on a feature vector which represent certain data that may be useful in determining whether or not speech is directed to the system. To create the feature vector operable by the system directed audio detector 1140, a feature extractor 1130 may be used. The feature extractor 1130 may input ASR results 1113 which include results from the processing of the audio data 1111 by a speech recognition component.

For privacy protection purposes, in certain configurations the ASR results 1113 may be obtained from a language processing component/ASR component located on device 110 or on a home remote component as opposed to a language processing component/ASR component located on a cloud or other system component(s) 120 so that audio data 1111 is not sent remote from the user's home unless the system directed input detector 1185 has determined that the input is system directed. Though this may be adjusted depending on user preferences/system configuration.

The ASR results 1113 may include an N-best list of top scoring ASR hypotheses and their corresponding scores, portions (or all of) an ASR lattice/trellis with scores, portions (or all of) an ASR search graph with scores, portions (or all of) an ASR confusion network with scores, or other such ASR output. As an example, the ASR results 1113 may include a trellis, which may include a raw search graph as scored during ASR decoding. The ASR results 1113 may also include a lattice, which may be a trellis as scored that has been pruned to remove certain hypotheses that do not exceed a score threshold or number of hypotheses threshold. The ASR results 1113 may also include a confusion network where paths from the lattice have been merged (e.g., merging hypotheses that may share all or a portion of a same word). The confusion network may be a data structure corresponding to a linear graph that may be used as an alternate representation of the most likely hypotheses of the decoder lattice. The ASR results 1113 may also include corresponding respective scores (such as for a trellis, lattice, confusion network, individual hypothesis, N-best list, etc.)

The ASR results 1113 (or other data 1115) may include other ASR result related data such as other features from the ASR system or data determined by another component. For example, the system 100 may determine an entropy of the ASR results (for example a trellis entropy or the like) that indicates a how spread apart the probability mass of the trellis is among the alternate hypotheses. A large entropy (e.g., large spread of probability mass over many hypotheses) may indicate the ASR component being less confident about its best hypothesis, which in turn may correlate to detected speech not being device directed. The entropy may be a feature included in other data 1115 to be considered by the system directed audio detector 1140.

The system 100 may also determine and consider ASR decoding costs, which may include features from Viterbi decoding costs of the ASR. Such features may indicate how well the input acoustics and vocabulary match with the acoustic models and language models. Higher Viterbi costs may indicate greater mismatch between the model and the given data, which may correlate to detected speech not being device directed. Confusion network feature may also be used. For example, an average number of arcs (where each arc represents a word) from a particular node (representing a potential join between two words) may measure how many competing hypotheses there are in the confusion network. A large number of competing hypotheses may indicate that the ASR component is less confident about the top hypothesis, which may correlate to detected speech not being device directed. Other such features or data from the ASR results 1113 may also be used as other data 1115.

The ASR results 1113 may be represented in a system directed detector (SDD) feature vector 1135 that can be used to determine whether speech was system-directed. The feature vector 1135 may represent the ASR results 1113 but may also represent audio data 1111 (which may be input to feature extractor 1130) or other information. Such ASR results may be helpful in determining if speech was system-directed. For example, if ASR results include a high scoring single hypothesis, that may indicate that the speech represented in the audio data 1111 is directed at, and intended for, the device 110. If, however, ASR results do not include a single high scoring hypothesis, but rather many lower scoring hypotheses, that may indicate some confusion on the part of the speech recognition component and may also indicate that the speech represented in the audio data 1111 was not directed at, nor intended for, the device 110.

The ASR results 1113 may include complete ASR results, for example ASR results corresponding to all speech between a startpoint and endpoint (such as a complete lattice, etc.). In this configuration the system 100 may wait until all ASR processing for a certain input audio has been completed before operating the feature extractor 1130 and system directed audio detector 1140. Thus the system directed audio detector 1140 may receive a feature vector 1135 that includes all the representations of the audio data 1111 created by the feature extractor 1130. The system directed audio detector 1140 may then operate a trained model (such as a DNN) on the feature vector 1135 to determine a score corresponding to a likelihood that the audio data 1111 includes a representation of system-directed speech. If the score is above a threshold, the system directed audio detector 1140 may determine that the audio data 1111 does include a representation of system-directed speech. The SDD result 1185 may include an indicator of whether the audio data includes system-directed speech, a score, and/or some other data.

The ASR results 1113 may also include incomplete ASR results, for example ASR results corresponding to only some speech between a between a startpoint and endpoint (such as an incomplete lattice, etc.). In this configuration the feature extractor 1130/system directed audio detector 1140 may be configured to operate on incomplete ASR results 1113 and thus the system directed audio detector 1140 may be configured to output an SSD result 1185 that provides an indication as to whether the portion of audio data processed (that corresponds to the incomplete ASR results) corresponds to system directed speech. The system 100 may thus be configured to perform ASR at least partially in parallel with the system directed audio detector 1140 to process ASR result data as it is ready and thus continually update an SDD result 1185. Once the system directed input detector 1185 has processed enough ASR results and/or the SDD result 1185 exceeds a threshold, the system 100 may determine that the audio data 1111 includes system-directed speech. Similarly, once the system directed input detector 1185 has processed enough ASR results and/or the SDD result 1185 drops below another threshold, the system 100 may determine that the audio data 1111 does not include system-directed speech.

The SDD result 1185 may be associated with a same unique ID as the audio data 1111 and VAD output 325 for purposes of tracking system processing across various components.

The feature extractor 1130 may also incorporate in a feature vector 1135 representations of other data 1115. Other data 1115 may include, for example, word embeddings from words output by the speech recognition component may be considered. Word embeddings are vector representations of words or sequences of words that show how specific words may be used relative to other words, such as in a large text corpus. A word embedding may be of a different length depending on how many words are in a text segment represented by the word embedding. For purposes of the feature extractor 1130 processing and representing a word embedding in a feature vector 1135 (which may be of a fixed length), a word embedding of unknown length may be processed by a neural network with memory, such as an LSTM (long short term memory) network. Each vector of a word embedding may be processed by the LSTM which may then output a fixed representation of the input word embedding vectors.

Other data 1115 may also include, for example, NLU output from a natural language component may be considered. Thus, if natural language output data indicates a high correlation between the audio data 1111 and an out-of-domain indication (e.g., no intent classifier scores from ICs or overall domain scores from recognizers reach a certain confidence threshold), this may indicate that the audio data 1111 does not include system-directed speech. Other data 1115 may also include, for example, an indicator of a user/speaker as output user recognition component. Thus, for example, if the user recognition component does not indicate the presence of a known user, or indicates the presence of a user associated with audio data 1111 that was not associated with a previous utterance, this may indicate that the audio data 1111 does not include system-directed speech. The other data 1115 may also include an indication that a voice represented in audio data 1111 is the same (or different) as the voice detected in previous input audio data corresponding to a previous utterance. The other data 1115 may also include directionality data, for example using beamforming or other audio processing techniques to determine a direction/location of a source of detected speech and whether that source direction/location matches a speaking user. The other data 1115 may also include data indicating that a direction of a user's speech is toward a device 110 or away from a device 110, which may indicate whether the speech was system directed or not.

Other data 1115 may also include image data 1112. For example, if image data is detected from one or more devices that are nearby to the device 110 (which may include the device 110 itself) that captured the audio data being processed using the system directed input detector 1185, the image data may be processed to determine whether a user is facing an audio capture device for purposes of determining whether speech is system-directed as further explained below.

Other data 1115 may also dialog history data. For example, the other data 1115 may include information about whether a speaker has changed from a previous utterance to the current audio data 1111, whether a topic of conversation has changed from a previous utterance to the current audio data, how NLU results from a previous utterance compare to NLU results obtained using the current audio data 1111, other system context information. The other data 1115 may also include an indicator as to whether the audio data 1111 was received as a result of a wake command or whether the audio data 1111 was sent without the device 110 detecting a wake command (e.g., the device 110 being instructed by system component(s) 120 and/or determining to send the audio data without first detecting a wake command).

Other data 1115 may also include information from a user profile associated with the device 110 and/or the system 100.

Other data 1115 may also include direction data, for example data regarding a direction of arrival of speech detected by the device, for example a beam index number, angle data, or the like. If second audio data is received from a different direction than first audio data, then the system 100 may be less likely to declare the second audio data to include system-directed speech since it is originating from a different location.

Other data 1115 may also include acoustic feature data such as pitch, prosody, intonation, volume, or other data descriptive of the speech in the audio data 1111. As a user may use a different vocal tone to speak with a machine than with another human, acoustic feature information may be useful in determining if speech is device-directed.

Other data 1115 may also include an indicator that indicates whether the audio data 1111 includes a wakeword. For example, if a device 110 detects a wakeword prior to sending the audio data 1111 to the system component(s) 120, the device 110 may send along an indicator that the device 110 detected a wakeword in the audio data 1111. In another example, the system component(s) 120 may include another component that processes incoming audio data 1111 to determine if it includes a wakeword. If it does, the component may create an indicator indicating that the audio data 1111 includes a wakeword. The indicator may then be included in other data 1115 to be incorporated in the feature vector 1135 and/or otherwise considered by the system directed audio detector 1140.

Other data 1115 may also include device history data such as information about previous operations related to the device 110 that sent the audio data 1111. For example, the other data 1115 may include information about a previous utterance that was just executed, where the utterance originated with the same device 110 as a current utterance and the previous utterance was within a certain time window of the current utterance. Device history data may be stored in a manner associated with the device identifier (which may also be included in other data 1115), which may also be used to track other information about the device, such as device hardware, capability, location, etc.

The other data 1114 used by the VAD 320 may include similar data and/or different data from the other data 1115 used by the feature extractor 1130. The other data 1114/1115 may thus include a variety of data corresponding to input audio from a previous utterance. That data may include acoustic data from a previous utterance, speaker ID/voice identification data from a previous utterance, information about the time between a previous utterance and a current utterance, or a variety of other data described herein taken from a previous utterance. A score threshold (for the system directed audio detector 1140 and/or the VAD 320) may be based on the data from the previous utterance. For example, a score threshold (for the system directed audio detector 1140 and/or the VAD 320) may be based on acoustic data from a previous utterance.

The feature extractor 1130 may output a single feature vector 1135 for one utterance/instance of input audio data 1111. The feature vector 1135 may consistently be a fixed length, or may be a variable length vector depending on the relevant data available for particular audio data 1111. Thus, the system directed audio detector 1140 may output a single SDD result 1185 per utterance/instance of input audio data 1111. The SDD result 1185 may be a binary indicator. Thus, if the incoming audio data 1111 includes system-directed speech, the system directed audio detector 1140 may output an indicator 1185 that the audio data 1111 does includes system-directed speech (e.g., a 1) and if the incoming audio data 1111 does not includes system-directed speech, the system directed audio detector 1140 may output an indicator 1185 that the audio data 1111 does not system-directed includes speech (e.g., a 0). The SDD result 1185 may also be a score (e.g., a number between 0 and 1) corresponding to a likelihood that the audio data 1111 includes system-directed speech. Although not illustrated in FIG. 11, the flow of data to and from the system directed input detector 1185 may be managed by an orchestrator component or by one or more other components.

The trained model(s) of the system directed audio detector 1140 may be trained on many different examples of SDD feature vectors that include both positive and negative training samples (e.g., samples that both represent system-directed speech and non-system directed speech) so that the DNN and/or other trained model of the system directed audio detector 1140 may be capable of robustly detecting when speech is system-directed versus when speech is not system-directed.

A further input to the system directed input detector 1185 may include output data from a TTS component to avoid synthesized speech output by the system being confused as system-directed speech spoken by a user. The output from the TTS component may allow the system to ignore synthesized speech in its considerations of whether speech was system directed. The output from the TTS component may also allow the system to determine whether a user captured utterance is responsive to the TTS output, thus improving system operation.

The system directed input detector 1185 may also use echo return loss enhancement (ERLE) and/or acoustic echo cancellation (AEC) data to avoid processing of audio data generated by the system.

As shown in FIG. 11, the system directed input detector 1185 may simply user audio data to determine whether an input is system directed (for example, system directed audio detector 1140 may output an SDD result 1185). This may be true particularly when no image data is available (for example for a device without a camera). If image data 1112 is available, however, the system 100 may also be configured to use image data 1112 to determine if an input is system directed. The image data 1112 may include image data captured by device 110 and/or image data captured by other device(s) in the environment of device 110. The audio data 1111, image data 1112 and other data 1114 may be timestamped or otherwise correlated so that the system directed input detector 1185 may determine that the data being analyzed all relates to a same time window so as to ensure alignment of data considered with regard to whether a particular input is system directed. For example, the system directed input detector 1185 may determine system directedness scores for every frame of audio data/every image of a video stream and may align and/or window them to determine a single overall score for a particular input that corresponds to a group of audio frames/images.

Image data 1112 along with other data 1114 may be received by feature extractor 1150. The feature extractor may create one or more feature vectors 1155 which may represent the image data 1112/other data 1114. In certain examples, other data 1114 may include data from an image processing component which may include information about faces, gesture, etc. detected in the image data 1112. For privacy protection purposes, in certain configurations any image processing/results thereof may be obtained from an image processing component located on device 110 or on a home remote component as opposed to an image processing component located on a cloud or other system component(s) 120 so that image data 1112 is not sent remote from the user's home unless the system directed input detector 1185 has determined that the input is system directed. Though this may be adjusted depending on user preferences/system configuration.

The feature vector 1155 may be passed to the user detector 1160. The user detector 1160 (which may use various components/operations of image processing component, user recognition component, etc.) may be configured to process image data 1112 and/or feature vector 1155 to determine information about the user's behavior which in turn may be used to determine if an input is system directed. For example, the user detector 1160 may be configured to determine the user's position/behavior with respect to device 110/system 100. The user detector 1160 may also be configured to determine whether a user's mouth is opening/closing in a manner that suggests the user is speaking. The user detector 1160 may also be configured to determine whether a user is nodding or shaking his/her head. The user detector 1160 may also be configured to determine whether a user's gaze is directed to the device 110, to another user, or to another object. For example, the use detector 1160 may include, or be configured to use data from, a gaze detector. The user detector 1160 may also be configured to determine gestures of the user such as a shoulder shrug, pointing toward an object, a wave, a hand up to indicate an instruction to stop, or a fingers moving to indicate an instruction to continue, holding up a certain number of fingers, putting a thumb up, etc. The user detector 1160 may also be configured to determine a user's position/orientation such as facing another user, facing the device 110, whether their back is turned, etc. The user detector 1160 may also be configured to determine relative positions of multiple users that appear in image data (and/or are speaking in audio data 1111 which may also be considered by the user detector 1160 along with feature vector 1135), for example which users are closer to a device 110 and which are farther away. The user detector 1160 (and/or other component) may also be configured to identify other objects represented in image data and determine whether objects are relevant to a dialog or system interaction (for example determining if a user is referring to an object through a movement or speech).

The user detector 1160 may operate one or more models (e.g., one or more classifiers) to determine if certain situations are represented in the image data 1112. For example the user detector 1160 may employ a visual directedness classifier that may determine, for each face detected in the image data 1112 whether that face is looking at the device 110 or not. For example, a light-weight convolutional neural network (CNN) may be used which takes a face image cropped from the result of the face detector as input and output a [0,1] score of how likely the face is directed to the camera or not. Another technique may include to determine a three-dimensional (3D) landmark of each face, estimate the 3D angle of the face and predict a directness score based on the 3D angle.

The user detector 1160 (or other component(s) such as those in image processing) may be configured to track a face in image data to determine which faces represented may belong to a same person. The system 100 may user IOU based tracker, a mean-shift based tracker, a particle filter based tracker or other technique.

The user detector 1160 (or other component(s) such as those included in a user recognition component) may be configured to determine whether a face represented in image data belongs to a person who is speaking or not, thus performing active speaker detection. The system 100 may take the output from the face tracker and aggregate a sequence of face from the same person as input and predict whether this person is speaking or not. Lip motion, user ID, detected voice data, and other data may be used to determine whether a user is speaking or not.

The system directed image detector 1170 may then determine, based on information from the user detector 1160, such as the image data 1112, whether an input relating to the image data 1112 is system directed. The system directed image detector 1170 may also operate on other input data, for example image data including raw image data 1112, image data including feature vector data 1155 based on raw image data, other data 1114, or other data. The determination by the system directed image detector 1170 may result in a score indicating whether the input is system directed based on the image data. If no audio data is available, the indication may be output as SDD result 1185. If audio data is available, the indication may be sent to system directed detector 1180 which may consider information from both system directed audio detector 1140 and system directed image detector 1170. The system directed detector 1180 may then process the data from both system directed audio detector 1140 and system directed image detector 1170 to come up with an overall determination as to whether an input was system directed, which may be output as SDD result 1185. The system directed detector 1180 may consider not only data output from system directed audio detector 1140 and system directed image detector 1170 but also other data/metadata corresponding to the input (for example, image data/feature data 1155, audio data/feature data 1135, image data 1112, audio data 1111, or the like discussed with regard to FIG. 11. The system directed detector 1180 may include one or more models which may analyze the various input data to make a determination regarding SDD result 1185.

In one example the determination of the system directed detector 1180 may be based on "AND" logic, for example determining an input is system directed only if affirmative data is received from both system directed audio detector 1140 and system directed image detector 1170. In another example the determination of the system directed detector 1180 may be based on "OR" logic, for example determining an input is system directed if affirmative data is received from either system directed audio detector 1140 or system directed image detector 1170. In another example the data received from system directed audio detector 1140 and system directed image detector 1170 are weighted individually based on other information available to system directed detector 1180 to determine to what extend audio and/or image data should impact the decision of whether an input is system directed.

As illustrated in FIG. 11, the system directed input detector 1185 may also receive information from the UED component 340. For example, the UED decision data 345 may indicate whether the user is or is not engaged with the device 110 and may be considered by the system directed input detector 1185 (e.g., by system directed audio detector 1140, system directed detector 1180, etc.) as part of the overall consideration of whether a system input was device directed.

While FIG. 11 illustrates the UED component 340 as being separate from the system directed input detector 1185, the disclosure is not limited thereto and the UED component 340 may be included within the system directed input detector 1185 without departing from the disclosure. For example, FIG. 11 is intended to conceptually illustrate an example in which the UED component 340 is used to augment the system directed input detector 1185 and improve an accuracy of the SDD result 1185, which may be generated using the system directed audio detector 1140, the system directed image detector 1170, and/or the UED component 340. The disclosure is not limited thereto, however, and the system directed input detector 1185 may generate the SDD result 1185 using only the system directed audio detector 1140 and the UED component 340 without departing from the disclosure. Additionally or alternatively, in some examples the system directed input detector 1185 may generate the SDD result 1185 using only the UED component 340 without departing from the disclosure.

While not illustrated in FIG. 11, in some examples the system directed input detector 1185 may also receive information from a wakeword (WW) component. For example, an indication that a wakeword was detected (e.g., WW data) may be considered by the system directed input detector 1185 (e.g., by system directed audio detector 1140, system directed detector 1180, etc.) as part of the overall consideration of whether a system input was device directed. Detection of a wakeword may be considered a strong signal that a particular input was device directed.

If an input is determined to be system directed/if a user is determined to be engaging with the system/device (for example as based on UED decision data 345, SDD result data 1185, etc.), the data related to the input may be sent to downstream components for further processing (e.g., to a language processing component). If an input is determined not to be system directed/if a user is determined to not be engaging with the system/device (for example as based on UED decision data 345, SDD result data 1185, etc.), the system 100 may take no further action regarding the data related to the input and may allow it to be deleted. In certain configurations, to maintain privacy, the operations to determine whether an input is system directed are performed by device 110 (or home server(s) associated with the device 110) and only if the input is determined to be system directed is further data (such as audio data 1111 or image data 1112) sent to system component(s) 120 that are outside a user's home or other direct control.

Various operations may be performed based on the determination of whether an input is determined to be system directed/if a user is determined to be engaging with the system/device (for example as based on UED decision data 345, SDD result data 1185, etc.). For example, if the device 110 determines that a speaker is not engaging with the system/device, the device may power down/reduce the power to a component of the device 110. For example, the device 110 may power down a display, light output, audio processing component (such as WW detector), communication component, speech processing component, etc. In response to the determination the device 110 may also transition to a different state. For example, if an input is determined to be system directed/if a user is determined to be engaging with the system/device the device 110 may transition to an awake or active state, an audio capture/audio data transmission state, a speech processing state, or the like. In another example, if an input is determined to not be system directed/if a user is determined to not be engaging with the system/device the device 110 may transition to an inactive or sleep state, a state of no audio capture/audio data transmission, reduced operations, or the like. In response to an input being determined to be system directed/if a user is determined to be engaging with the system/device the device 110 may perform an operation such as performing ASR/speech transcription of input audio data. The device 110 may generate transcription data using a machine learning model such as an ASR component or other component.

In some examples, the device 110 and/or the system component(s) 120 may include an image processing component. The image processing component may be located across different physical and/or virtual machines. The image processing component may receive and analyze image data (which may include single images or a plurality of images such as in a video feed). The image processing component may work with other components of the device 110 and/or the system component(s) 120 to perform various operations. For example the image processing component may work with user recognition component to assist with user recognition using image data. The image processing component may also include or otherwise be associated with image data storage which may store aspects of image data used by image processing component. The image data may be of different formats such as JPEG, GIF, BMP, MPEG, video formats, and the like.

Image matching algorithms, such as those used by image processing component, may take advantage of the fact that an image of an object or scene contains a number of feature points. Feature points are specific points in an image which are robust to changes in image rotation, scale, viewpoint or lighting conditions. This means that these feature points will often be present in both the images to be compared, even if the two images differ. These feature points may also be known as "points of interest." Therefore, a first stage of the image matching algorithm may include finding these feature points in the image. An image pyramid may be constructed to determine the feature points of an image. An image pyramid is a scale-space representation of the image, e.g., it contains various pyramid images, each of which is a representation of the image at a particular scale. The scale-space representation enables the image matching algorithm to match images that differ in overall scale (such as images taken at different distances from an object). Pyramid images may be smoothed and downsampled versions of an original image.

To build a database of object images, with multiple objects per image, a number of different images of an object may be taken from different viewpoints. From those images, feature points may be extracted and pyramid images constructed. Multiple images from different points of view of each particular object may be taken and linked within the database (for example within a tree structure described below). The multiple images may correspond to different viewpoints of the object sufficient to identify the object from any later angle that may be included in a user's query image. For example, a shoe may look very different from a bottom view than from a top view than from a side view. For certain objects, this number of different image angles may be 6 (top, bottom, left side, right side, front, back), for other objects this may be more or less depending on various factors, including how many images should be taken to ensure the object may be recognized in an incoming query image. With different images of the object available, it is more likely that an incoming image from a user may be recognized by the system and the object identified, even if the user's incoming image is taken at a slightly different angle.

This process may be repeated for multiple objects. For large databases, such as an online shopping database where a user may submit an image of an object to be identified, this process may be repeated thousands, if not millions of times to construct a database of images and data for image matching. The database also may continually be updated and/or refined to account for a changing catalog of objects to be recognized.

When configuring the database, pyramid images, feature point data, and/or other information from the images or objects may be used to cluster features and build a tree of objects and images, where each node of the tree will keep lists of objects and corresponding features. The tree may be configured to group visually significant subsets of images/features to ease matching of submitted images for object detection. Data about objects to be recognized may be stored by the system in image data, profile storage, or other storage component.

Image selection component may select desired images from input image data to use for image processing at runtime. For example, input image data may come from a series of sequential images, such as a video stream where each image is a frame of the video stream. These incoming images need to be sorted to determine which images will be selected for further object recognition processing as performing image processing on low quality images may result in an undesired user experience. To avoid such an undesirable user experience, the time to perform the complete recognition process, from first starting the video feed to delivering results to the user, should be as short as possible. As images in a video feed may come in rapid succession, the image processing component may be configured to select or discard an image quickly so that the system can, in turn, quickly process the selected image and deliver results to a user. The image selection component may select an image for object recognition by computing a metric/feature for each frame in the video feed and selecting an image for processing if the metric exceeds a certain threshold. While the image selection component may be described as part of system component(s) 120, it may also be located on device 110 so that the device may select only desired image(s) to send to system component(s) 120, thus avoiding sending too much image data to system component(s) 120 (thus expending unnecessary computing/communication resources). Thus the device may select only the best quality images for purposes of image analysis.

The metrics used to select an image may be general image quality metrics (focus, sharpness, motion, etc.) or may be customized image quality metrics. The metrics may be computed by software components or hardware components. For example, the metrics may be derived from output of device sensors such as a gyroscope, accelerometer, field sensors, inertial sensors, camera metadata, or other components. The metrics may thus be image based (such as a statistic derived from an image or taken from camera metadata like focal length or the like) or may be non-image based (for example, motion data derived from a gyroscope, accelerometer, GPS sensor, etc.). As images from the video feed are obtained by the system, the system, such as a device, may determine metric values for the image. One or more metrics may be determined for each image. To account for temporal fluctuation, the individual metrics for each respective image may be compared to the metric values for previous images in the image feed and thus a historical metric value for the image and the metric may be calculated. This historical metric may also be referred to as a historical metric value. The historical metric values may include representations of certain metric values for the image compared to the values for that metric for a group of different images in the same video feed. The historical metric(s) may be processed using a trained classifier model to select which images are suitable for later processing.

For example, if a particular image is to be measured using a focus metric, which is a numerical representation of the focus of the image, the focus metric may also be computed for the previous N frames to the particular image. N is a configurable number and may vary depending on system constraints such as latency, accuracy, etc. For example, N may be 30 image frames, representing, for example, one second of video at a video feed of 30 frames-per-second. A mean of the focus metrics for the previous N images may be computed, along with a standard deviation for the focus metric. For example, for an image number X+1 in a video feed sequence, the previous N images, may have various metric values associated with each of them. Various metrics such as focus, motion, and contrast are discussed, but others are possible. A value for each metric for each of the N images may be calculated, and then from those individual values, a mean value and standard deviation value may be calculated. The mean and standard deviation (STD) may then be used to calculate a normalized historical metric value, for example STD(metric)/MEAN(metric). Thus, the value of a historical focus metric at a particular image may be the STD divided by the mean for the focus metric for the previous N frames. For example, historical metrics (HIST) for focus, motion, and contrast may be expressed as:

HIST_Focus=STD_Focus/MEAN_Focus

HIST_Motion=STD_Motion/MEAN_Motion

HIST_Contrast=STD_Contrast/MEAN_Contrast

In one embodiment the historical metric may be further normalized by dividing the above historical metrics by the number of frames N, particularly in situations where there are small number of frames under consideration for the particular time window. The historical metrics may be recalculated with each new image frame that is received as part of the video feed. Thus each frame of an incoming video feed may have a different historical metric from the frame before. The metrics for a particular image of a video feed may be compared historical metrics to select a desirable image on which to perform image processing.

Image selection component may perform various operations to identify potential locations in an image that may contain recognizable text. This process may be referred to as glyph region detection. A glyph is a text character that has yet to be recognized. If a glyph region is detected, various metrics may be calculated to assist the eventual optical character recognition (OCR) process. For example, the same metrics used for overall image selection may be re-used or recalculated for the specific glyph region. Thus, while the entire image may be of sufficiently high quality, the quality of the specific glyph region (i.e. focus, contrast, intensity, etc.) may be measured. If the glyph region is of poor quality, the image may be rejected for purposes of text recognition.

Image selection component may generate a bounding box that bounds a line of text. The bounding box may bound the glyph region. Value(s) for image/region suitability metric(s) may be calculated for the portion of the image in the bounding box. Value(s) for the same metric(s) may also be calculated for the portion of the image outside the bounding box. The value(s) for inside the bounding box may then be compared to the value(s) outside the bounding box to make another determination on the suitability of the image. This determination may also use a classifier.

Additional features may be calculated for determining whether an image includes a text region of sufficient quality for further processing. The values of these features may also be processed using a classifier to determine whether the image contains true text character/glyphs or is otherwise suitable for recognition processing. To locally classify each candidate character location as a true text character/glyph location, a set of features that capture salient characteristics of the candidate location is extracted from the local pixel pattern. Such features may include aspect ratio (bounding box width/bounding box height), compactness ($4*\pi*$candidate glyph area/(perimeter)2), solidity (candidate glyph area/bounding box area), stroke-width to width ratio (maximum stroke width/bounding box width), stroke-width to height ratio (maximum stroke width/bounding box height), convexity (convex hull perimeter/perimeter), raw compactness ($4*\pi*$(candidate glyph number of pixels)/(perimeter)2), number of holes in candidate glyph, or other features. Other candidate region identification techniques may be used. For example, the system 100 may use techniques involving maximally stable extremal regions (MSERs). Instead of MSERs (or in conjunction with MSERs), the candidate locations may be identified using histogram of oriented gradients (HoG) and Gabor features.

If an image is sufficiently high quality it may be selected by image selection for sending to another component (e.g., from device 110 to system component(s) 120) and/or for further processing, such as text recognition, object detection/resolution, etc.

The feature data calculated by image selection component may be sent to other components such as text recognition component, objection detection component, object resolution component, etc. so that those components may use the feature data in their operations. Other preprocessing operations such as masking, binarization, etc. may be performed on image data prior to recognition/resolution operations. Those preprocessing operations may be performed by the device prior to sending image data or by system component(s) 120.

Object detection component may be configured to analyze image data to identify one or more objects represented in the image data. Various approaches can be used to attempt to recognize and identify objects, as well as to determine the types of those objects and applications or actions that correspond to those types of objects, as is known or used in the art. For example, various computer vision algorithms can be used to attempt to locate, recognize, and/or identify various types of objects in an image or video sequence. Computer vision algorithms can utilize various different approaches, as may include edge matching, edge detection, recognition by parts, gradient matching, histogram comparisons, interpretation trees, and the like.

The object detection component may process at least a portion of the image data to determine feature data. The feature data is indicative of one or more features that are depicted in the image data. For example, the features may be face data, or other objects, for example as represented by stored data in profile storage. Other examples of features may include shapes of body parts or other such features that identify the presence of a human. Other examples of features may include edges of doors, shadows on the wall, texture on the walls, portions of artwork in the environment, and so forth to identify a space. The object detection component may compare detected features to stored data (e.g., in profile storage, image data, or other storage) indicating how detected features may relate to known objects for purposes of object detection.

Various techniques may be used to determine the presence of features in image data. For example, one or more of a Canny detector, Sobel detector, difference of Gaussians, features from accelerated segment test (FAST) detector, scale-invariant feature transform (SIFT), speeded up robust features (SURF), color SIFT, local binary patterns (LBP), trained convolutional neural network, or other detection methodologies may be used to determine features in the image data. A feature that has been detected may have an associated descriptor that characterizes that feature. The descriptor may comprise a vector value in some implementations. For example, the descriptor may comprise data indicative of the feature with respect to many (e.g., 256) different dimensions.

One statistical algorithm that may be used for geometric matching of images is the Random Sample Consensus (RANSAC) algorithm, although other variants of RANSAC-like algorithms or other statistical algorithms may also be used. In RANSAC, a small set of putative correspondences is randomly sampled. Thereafter, a geometric transformation is generated using these sampled feature points. After generating the transformation, the putative correspondences that fit the model are determined. The putative correspondences that fit the model and are geometrically consistent and called "inliers." The inliers are pairs of feature points, one from each image, that may correspond to each other, where the pair fits the model within a certain comparison threshold for the visual (and other) contents of the feature points, and are geometrically consistent (as explained below relative to motion estimation). A total number of inliers may be determined. The above mentioned steps may be repeated until the number of repetitions/trials is greater than a predefined threshold or the number of inliers for the image is sufficiently high to determine an image as a match (for example the number of inliers exceeds a threshold). The RANSAC algorithm returns the model with the highest number of inliers corresponding to the model.

To further test pairs of putative corresponding feature points between images, after the putative correspondences are determined, a topological equivalence test may be performed on a subset of putative correspondences to avoid forming a physically invalid transformation. After the transformation is determined, an orientation consistency test may be performed. An offset point may be determined for the feature points in the subset of putative correspondences in one of the images. Each offset point is displaced from its corresponding feature point in the direction of the orientation of that feature point. The transformation is discarded based on orientation of the feature points obtained from the feature points in the subset of putative correspondences if any one of the images being matched and its offset point differs from an estimated orientation by a predefined limit. Subsequently, motion estimation may be performed using the subset of putative correspondences which satisfy the topological equivalence test.

Motion estimation (also called geometric verification) may determine the relative differences in position between corresponding pairs of putative corresponding feature points. A geometric relationship between putative corresponding feature points may determine where in one image (e.g., the image input to be matched) a particular point is found relative to that potentially same point in the putatively matching image (i.e., a database image). The geometric relationship between many putatively corresponding feature point pairs may also be determined, thus creating a potential map between putatively corresponding feature points across images. Then the geometric relationship of these points may be compared to determine if a sufficient number of points correspond (that is, if the geometric relationship between point pairs is within a certain threshold score for the geometric relationship), thus indicating that one image may represent the same real-world physical object, albeit from a different point of view. Thus, the motion estimation may determine that the object in one image is the same as the object in another image, only rotated by a certain angle or viewed from a different distance, etc.

The above processes of image comparing feature points and performing motion estimation across putative matching images may be performed multiple times for a particular query image to compare the query image to multiple potential matches among the stored database images. Dozens of comparisons may be performed before one (or more) satisfactory matches that exceed the relevant thresholds (for both matching feature points and motion estimation) may be found. The thresholds may also include a confidence threshold, which compares each potential matching image with a confidence score that may be based on the above processing. If the confidence score exceeds a certain high threshold, the system 100 may stop processing additional candidate matches and simply select the high confidence match as the final match. Or if, the confidence score of an image is within a certain range, the system 100 may keep the candidate image as a potential match while continuing to search other database images for potential matches. In certain situations, multiple database images may exceed the various matching/confidence thresholds and may be determined to be candidate matches. In this situation, a comparison of a weight or confidence score may be used to select the final match, or some combination of candidate matches may be used to return results. The system 100 may continue attempting to match an image until a certain number of potential matches are identified, a certain confidence score is reached (either individually with a single potential match or among multiple matches), or some other search stop indicator is triggered. For example, a weight may be given to each object of a potential matching database image. That weight may incrementally increase if multiple query images (for example, multiple frames from the same image stream) are found to be matches with database images of a same object. If that weight exceeds a threshold, a search stop indicator may be triggered and the corresponding object selected as the match.

Once an object is detected by object detection component the system 100 may determine which object is actually seen using object resolution component. Thus one component, such as object detection component, may detect if an object is represented in an image while another component, object resolution component may determine which object is actually represented. Although illustrated as separate components, the system 100 may also be configured so that a single component may perform both object detection and object resolution.

For example, when a database image is selected as a match to the query image, the object in the query image may be determined to be the object in the matching database image. An object identifier associated with the database image (such as a product ID or other identifier) may be used to return results to a user, along the lines of "I see you holding object X" along with other information, such giving the user information about the object. If multiple potential matches are returned (such as when the system can't determine exactly what object is found or if multiple objects appear in the query image) the system 100 may indicate to the user that multiple potential matching objects are found and may return information/options related to the multiple objects.

In another example, object detection component may determine that a type of object is represented in image data and object resolution component may then determine which specific object is represented. The object resolution component may also make available specific data about a recognized object to further components so that further operations may be performed with regard to the resolved object.

Object detection component may be configured to process image data to detect a representation of an approximately two-dimensional (2D) object (such as a piece of paper) or a three-dimensional (3D) object (such as a face). Such recognition may be based on available stored data which in turn may have been provided through an image data ingestion process managed by image data ingestion component. Various techniques may be used to determine the presence of features in image data. For example, one or more of a Canny detector, Sobel detector, difference of Gaussians, features from accelerated segment test (FAST) detector, scale-invariant feature transform (SIFT), speeded up robust features (SURF), color SIFT, local binary patterns (LBP), trained convolutional neural network, or other detection methodologies may be used to determine features in the image data. A feature that has been detected may have an associated descriptor that characterizes that feature. The descriptor may comprise a vector value in some implementations. For example, the descriptor may comprise data indicative of the feature with respect to many (e.g., 256) different dimensions.

In various embodiments, the object detection component may be configured to detect a user or a portion of a user (e.g., head, face, hands) in image data and determine an initial position and/or orientation of the user in the image data.

Various approaches can be used to detect a user within the image data. Techniques for detecting a user can sometimes be characterized as either feature-based or appearance-based. Feature-based approaches generally involve extracting features from an image and applying various rules, metrics, or heuristics to determine whether a person is present in an image. Extracted features can be low-level image features, such as points (e.g., line intersections, high variance points, local curvature discontinuities of Gabor wavelets, inflection points of curves, local extrema of wavelet transforms, Harris corners, Shi Tomasi points), edges (e.g., Canny edges, Shen-Castan (ISEF) edges), or regions of interest (e.g., blobs, Laplacian of Gaussian blobs, Difference of Gaussian blobs, Hessian blobs, maximally stable extremum regions (MSERs)). An example of a low-level image feature-based approach for user detection is the grouping of edges method. In the grouping of edges method, an edge map (generated via, e.g., a Canny detector, Sobel filter, Marr-Hildreth edge operator) and heuristics are used to remove and group edges from an input image so that only the edges of the contour of a face remain. A box or ellipse is then fit to the boundary between the head region and the background. Low-level feature-based methods can also be based on gray level information or skin color. For example, facial features such as eyebrows, pupils, and lips generally appear darker than surrounding regions of the face and this observation can be used to detect a face within an image. In one such approach, a low resolution Gaussian or Laplacian of an input image is utilized to locate linear sequences of similarly oriented blobs and streaks, such as two dark blobs and three light blobs to represent eyes, cheekbones, and nose and streaks to represent the outline of the face, eyebrows, and lips. Geometric rules can be applied to analyze the spatial relationships among the blobs and streaks to verify whether a person is located in the image. Skin color can also be used as a basis for detecting and/or tracking a user because skin color comprises a limited range of the color spectrum that can be relatively efficient to locate in an image.

Extracted features can also be based on higher-level characteristics or features of a user, such as eyes, nose, and/or mouth. Certain high-level feature-based methods can be characterized as top-down or bottom-up. A top-down approach first attempts to detect a particular user feature (e.g., head or face) and then validates existence of a person in an image by detecting constituent components of that user feature (e.g., eyes, nose, mouth). In contrast, a bottom-up approach begins by extracting the constituent components first and then confirming the presence of a person based on the constituent components being correctly arranged. For example, one top-down feature-based approach is the multi-resolution rule-based method. In this embodiment, a person is detected as present within an image by generating from the image a set of pyramidal or hierarchical images that are convolved and subsampled at each ascending level of the image pyramid or hierarchy (e.g., Gaussian pyramid, Difference of Gaussian pyramid, Laplacian pyramid). At the highest level, comprising the lowest resolution image of the image pyramid or hierarchy, the most general set of rules can be applied to find whether a user is represented. An example set of rules for detecting a face may include the upper round part of a face comprising a set of pixels of uniform intensity, the center part of a face comprising a set of pixels of a second uniform intensity, and the difference between the intensities of the upper round part and the center part of the face being within a threshold intensity difference. The image pyramid or hierarchy is descended and face candidates detected at a higher level conforming to the rules for that level can be processed at finer resolutions at a lower level according to a more specific set of rules. An example set of rules at a lower level or higher resolution image of the pyramid or hierarchy can be based on local histogram equalization and edge detection, and rules for the lowest level or highest resolution image of the pyramid or hierarchy can be based on facial feature metrics. In another top-down approach, face candidates are located based on the Kanade projection method for locating the boundary of a face. In the projection method, an intensity profile of an input image is first analyzed along the horizontal axis, and two local minima are determined to be candidates for the left and right side of a head. The intensity profile along the vertical axis is then evaluated and local minima are determined to be candidates for the locations of the mouth, nose, and eyes. Detection rules for eyebrow/eyes, nostrils/nose, and mouth or similar approaches can be used to validate whether the candidate is indeed a face.

Some feature-based and appearance-based methods use template matching to determine whether a user is represented in an image. Template matching is based on matching a pre-defined face pattern or parameterized function to locate the user within an image. Templates are typically prepared manually "offline." In template matching, correlation values for the head and facial features are obtained by comparing one or more templates to an input image, and the presence of a face is determined from the correlation values. One template-based approach for detecting a user within an image is the Yuille method, which matches a parameterized face template to face candidate regions of an input image. Two additional templates are used for matching the eyes and mouth respectively. An energy function is defined that links edges, peaks, and valleys in the image intensity profile to the corresponding characteristics in the templates, and the energy function is minimized by iteratively adjusting the parameters of the template to the fit to the image. Another template-matching method is the active shape model (ASM). ASMs statistically model the shape of the deformable object (e.g., user's head, face, other user features) and are built offline with a training set of images having labeled landmarks. The shape of the deformable object can be represented by a vector of the labeled landmarks. The shape vector can be normalized and projected onto a low dimensional subspace using principal component analysis (PCA). The ASM is used as a template to determine whether a person is located in an image. The ASM has led to the use of Active Appearance Models (AAMs), which further include defining a texture or intensity vector as part of the template. Based on a point distribution model, images in the training set of images can be transformed to the mean shape to produce shape-free patches. The intensities from these patches can be sampled to generate the intensity vector, and the dimensionality of the intensity vector may be reduced using PCA. The parameters of the AAM can be optimized and the AAM can be fit to an object appearing in the new image using, for example, a gradient descent technique or linear regression.

Various other appearance-based methods can also be used to locate whether a user is represented in an image. Appearance-based methods typically use classifiers that are trained from positive examples of persons represented in images and negative examples of images with no persons. Application of the classifiers to an input image can determine whether a user exists in an image. Appearance-based methods can be based on PCA, neural networks, support vector machines (SVMs), naïve Bayes classifiers, the Hidden Markov model (HMM), inductive learning, adaptive boosting (Adaboost), among others. Eigenfaces are an example of an approach based on PCA. PCA is performed on a training set of images known to include faces to determine the eigenvectors of the covariance matrix of the training set. The Eigenfaces span a subspace called the "face space." Images of faces are projected onto the subspace and clustered. To detect a face of a person in an image, the distance between a region of the image and the "face space" is computed for all location in the image. The distance from the "face space" is used as a measure of whether image subject matter comprises a face and the distances from "face space" form a "face map." A face can be detected from the local minima of the "face map."

Neural networks are inspired by biological neural networks and consist of an interconnected group of functions or classifiers that process information using a connectionist approach. Neural networks change their structure during training, such as by merging overlapping detections within one network and training an arbitration network to combine the results from different networks. Examples of neural network-based approaches include Rowley's multilayer neural network, the autoassociative neural network, the probabilistic decision-based neural network (PDBNN), the sparse network of winnows (SNoW). A variation of neural networks are deep belief networks (DBNs) which use unsupervised pre-training to generate a neural network to first learn useful features, and training the DBN further by back-propagation with trained data.

Support vector machines (SVMs) operate under the principle of structural risk minimization, which aims to minimize an upper bound on the expected generalization error. An SVM seeks to find the optimal separating hyperplane constructed by support vectors, and is defined as a quadratic programming problem. The Naïve Bayes classifier estimates the local appearance and position of face patterns at multiple resolutions. At each scale, a face image is decomposed into subregions and the subregions are further decomposed according to space, frequency, and orientation. The statistics of each projected subregion are estimated from the projected samples to learn the joint distribution of object and position. A face is determined to be within an image if the likelihood ratio is greater than the ratio of prior probabilities, i.e., (P(image|object))/(P(image|non-object))>(P(non-object))/(P(object)). In HMM-based approaches, face patterns are treated as sequences of observation vectors each comprising a strip of pixels. Each strip of pixels is treated as an observation or state of the HMM and boundaries between strips of pixels are represented by transitions between observations or states according to statistical modeling. Inductive learning approaches, such as those based on Quinlan's C4.5 algorithm or Mitchell's Find-S algorithm, can also be used to detect the presence of persons in images.

AdaBoost is a machine learning boosting algorithm which finds a highly accurate hypothesis (i.e., low error rate) from a combination of many "weak" hypotheses (i.e., substantial error rate). Given a data set comprising examples within a class and not within the class and weights based on the difficulty of classifying an example and a weak set of classifiers, AdaBoost generates and calls a new weak classifier in each of a series of rounds. For each call, the distribution of weights is updated that indicates the importance of examples in the data set for the classification. On each round, the weights of each incorrectly classified example are increased, and the weights of each correctly classified example is decreased so the new classifier focuses on the difficult examples (i.e., those examples have not been correctly classified). An example of an AdaBoost-based approach is the Viola-Jones detector.

After at least a portion of a user has been detected in image data captured by a computing device, approaches in accordance with various embodiments track the detected portion of the user, for example using object tracking component. The object tracking component, gaze detector, or other component(s), may use user recognition data or other information related to the user recognition component to identify and/or track a user using image data, although the disclosure is not limited thereto.

Figure 12:
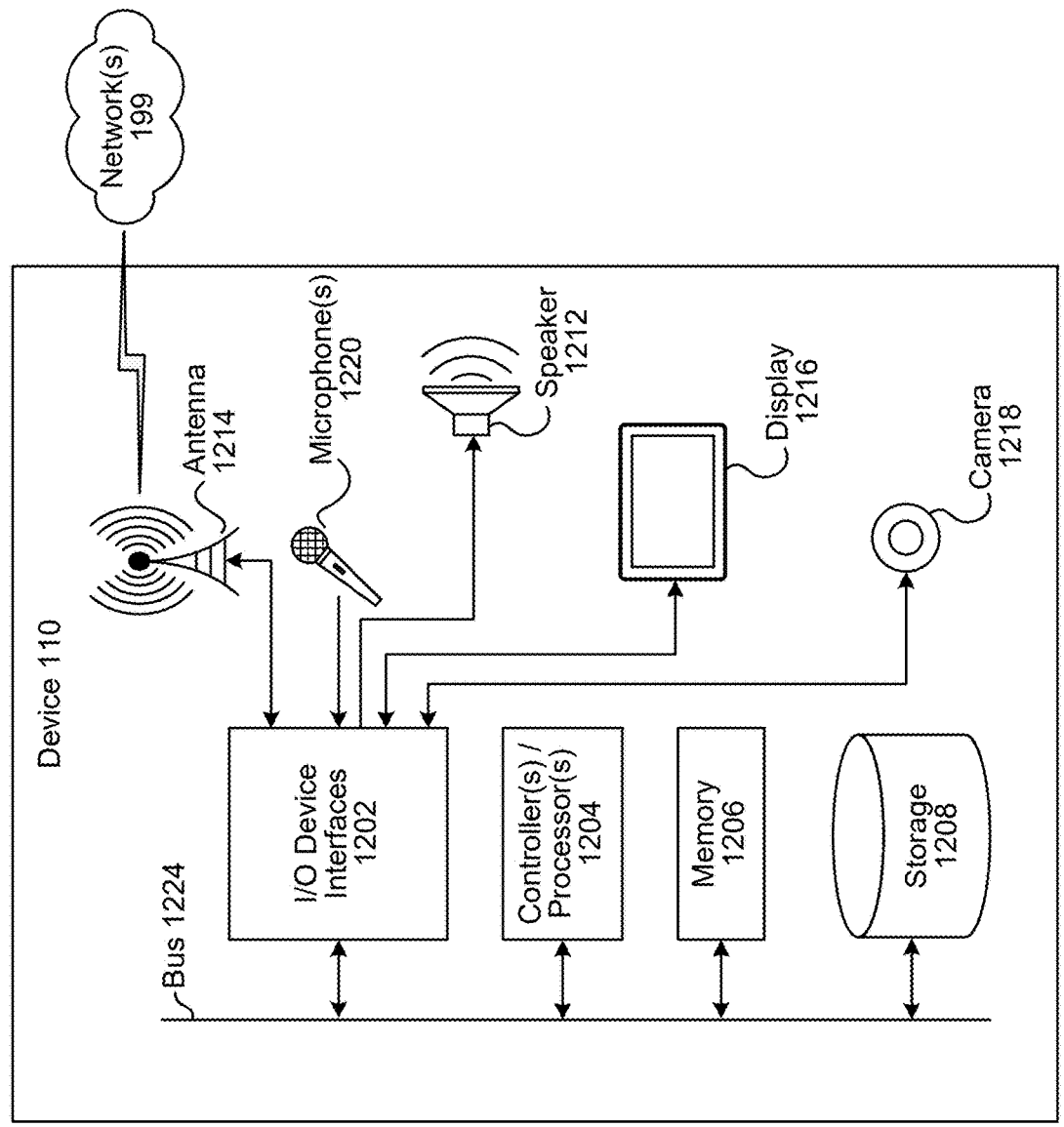
FIG. 12 is a block diagram conceptually illustrating example components of a device according to embodiments of the present disclosure.
Figure 13:
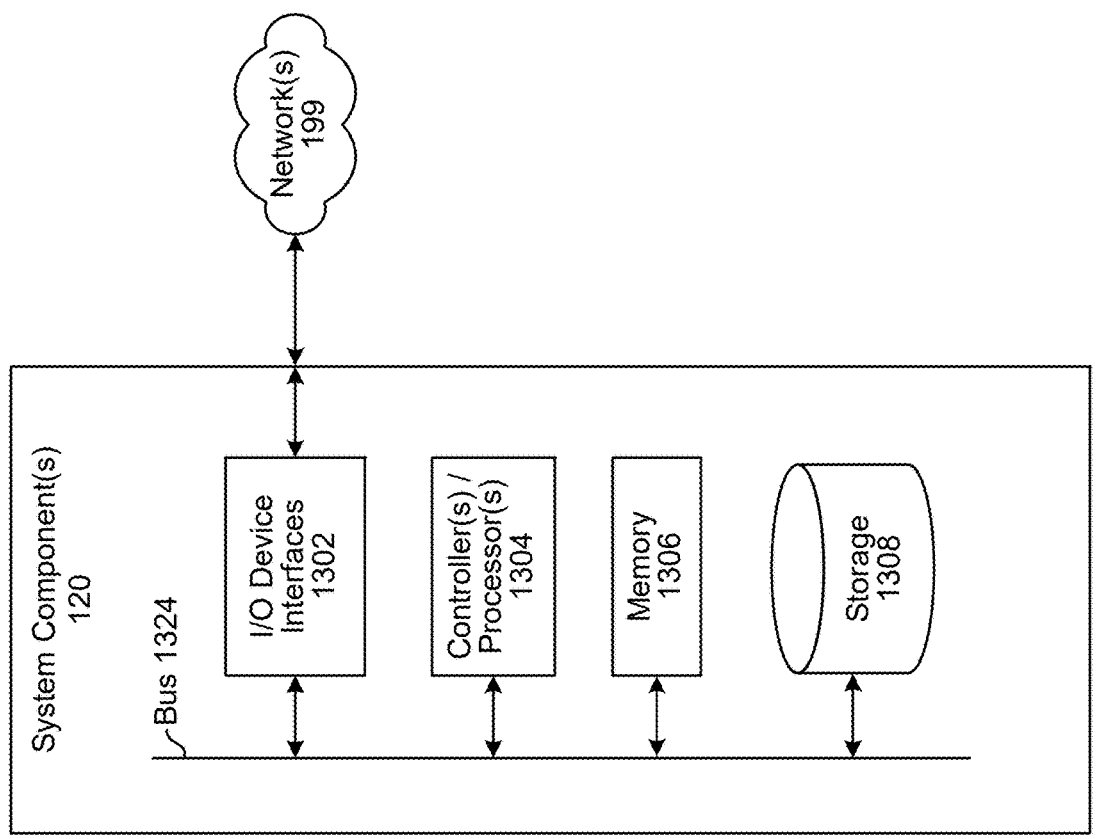
FIG. 13 is a block diagram conceptually illustrating example components of system components according to embodiments of the present disclosure.

FIG. 12 is a block diagram conceptually illustrating a device 110 that may be used with the system. FIG. 13 is a block diagram conceptually illustrating example components of system component(s) 120 according to embodiments of the present disclosure. The system component(s) 120 may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The system component(s) 120 may be configured to operate using one or more of a client-server model, a computer bureau model, grid computing techniques, fog computing techniques, mainframe techniques, utility computing techniques, a peer-to-peer model, sandbox techniques, or other computing techniques.

Each of these devices (110/120) may include one or more controllers/processors (1204/1304), which may each include a central processing unit (CPU) for processing data and computer-readable instructions, and a memory (1206/1306) for storing data and instructions of the respective device. The memories (1206/1306) may individually include volatile random access memory (RAM), non-volatile read only memory (ROM), non-volatile magnetoresistive memory (MRAM), and/or other types of memory. Each device (110/120) may also include a data storage component (1208/1308) for storing data and controller/processor-executable instructions. Each data storage component (1208/1308) may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (1202/1302).

Computer instructions for operating each device (110/120) and its various components may be executed by the respective device's controller(s)/processor(s) (1204/1304), using the memory (1206/1306) as temporary "working" storage at runtime. A device's computer instructions may be stored in a non-transitory manner in non-volatile memory (1206/1306), storage (1208/1308), or an external device(s). Alternatively, some or all of the executable instructions may be embedded in hardware or firmware on the respective device in addition to or instead of software.

Each device (110/120) includes input/output device interfaces (1202/1302). A variety of components may be connected through the input/output device interfaces (1202/1302), as will be discussed further below. Additionally, each device (110/120) may include an address/data bus (1224/1324) for conveying data among components of the respective device. Each component within a device (110/120) may also be directly connected to other components in addition to (or instead of) being connected to other components across the bus (1224/1324).

Referring to FIG. 12, the device 110 may include input/output device interfaces 1202 that connect to a variety of components such as an audio output component such as a speaker 1212, a wired headset or a wireless headset (not illustrated), or other component capable of outputting audio. The device 110 may also include an audio capture component. The audio capture component may be, for example, a microphone 1220 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1216 for displaying content and/or a camera 1218 to capture image data, although the disclosure is not limited thereto.

Via antenna(s) 1214/1314, the input/output device interfaces 1202/1302 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system 100 may be distributed across a networked environment. The I/O device interface (1202/1302) may also include communication components that allow data to be exchanged between devices such as different physical servers in a collection of servers or other components.

The components of the device(s) (110/120) may include their own dedicated processors, memory, and/or storage. Alternatively, one or more of the components of the device(s) (110/120) may utilize the I/O interfaces (1202/1302), processor(s) (1204/1304), memory (1206/1306), and/or storage (1208/1308) of the device(s) (110/120).

As noted above, multiple devices may be employed in a single system. In such a multi-device system, each of the devices may include different components for performing different aspects of the system's processing. The multiple devices may include overlapping components. The components of the device(s) (110/120), as described herein, are illustrative, and may be located as a stand-alone device or may be included, in whole or in part, as a component of a larger device or system.

As illustrated in FIG. 14, multiple devices (110a-110e, 120) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device with display 110a, a speech-detection device 110b, an input/output (I/O) limited device 110c (e.g., a device such as a FireTV stick or the like), a display/smart television 110d, a motile device 110e, and/or the like may be connected to the network(s) 199 through a wireless service provider, over a WiFi or cellular network connection, or the like. Other devices are included as network-connected support devices, such as system component(s) 120 and/or others. The support devices may connect to the network(s) 199 through a wired connection or wireless connection.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system 100 may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system 100 may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. An electronic device comprising:
   a plurality of microphones;
   a loudspeaker;
   one or more processors; and
   one or more non-transitory computer readable media storing processor executable instructions which, when executed using the one or more processors, cause the electronic device to perform operations comprising:
   determining, based on first audio data corresponding to sound captured by at least two microphones of the plurality of microphones, first sound source localization data comprising:
   first cell data indicating a first three-dimensional vector and a first power value associated with the first three-dimensional vector, and
   second cell data indicating a second three-dimensional vector and a second power value associated with the second three-dimensional vector;
   determining, based on the first sound source localization data:
   a first metric representing direct-to-reverberant ratio information, and
   a second metric representing direction variance information;
   based on the first metric and the second metric, using a first machine learning model to determine model output estimating user engagement; and
   executing, based on the model output, a first operation.

2. The electronic device of claim 1, wherein:
   the first sound source localization data comprises data indicating, for each respective cell of a plurality of cells, a respective three-dimensional vector and a respective power value associated with the respective three-dimensional vector, the plurality of cells including a first cell corresponding to the first cell data and a second cell corresponding to the second cell data; and
   the one or more computer readable media store further processor executable instructions which, when executed using the one or more processors, cause the electronic device to perform operations comprising:
   determining, based on the first sound source localization data, that the first power value is a peak power value among the plurality of cells,
   determining, based on the first sound source localization data, a mean power value for the plurality of cells, and
   determining a peak-to-mean ratio value based on the first power value and the mean power value,
   wherein the peak-to-mean ratio value is the first metric.

3. The electronic device of claim 1, wherein:
   the first sound source localization data comprises data indicating, for each respective cell of a plurality of cells, a respective three-dimensional vector and a respective power value associated with the respective three-dimensional vector, the plurality of cells including a first cell corresponding to the first cell data and a second cell corresponding to the second cell data; and
   the one or more computer readable media store further processor executable instructions which, when executed using the one or more processors, cause the electronic device to perform operations comprising:

determining, based on the first sound source localization data, first data indicating a power-weighted mean direction vector, wherein the second metric is determined based on the first data.

4. The electronic device of claim 1, wherein the first sound source localization data represents sound source localization data for a first frame of audio data, and wherein the one or more computer readable media store further processor executable instructions which, when executed using the one or more processors, cause the electronic device to perform operations comprising:

determining, based on first audio data corresponding to sound captured by a second set of microphones of the plurality of microphones, second sound source localization data comprising data indicating, for each respective cell of a plurality of cells, a respective three-dimensional vector and a respective power value associated with the respective three-dimensional vector;

wherein the first metric is determined based on the first sound source localization data and the second sound source localization data; and wherein the second metric is determined based on the first sound source localization data and the second sound source localization data.

5. The electronic device of claim 1, wherein the first sound source localization data represents sound source localization data for a first frame of audio data, and wherein the one or more computer readable media store further processor executable instructions which, when executed using the one or more processors, cause the electronic device to perform operations comprising:

determining, based on first audio data corresponding to sound captured by a second set of microphones of the plurality of microphones, second sound source localization data comprising data indicating, for each respective cell of a plurality of cells, a respective three-dimensional vector and a respective power value associated with the respective three-dimensional vector; and determining, based on the second sound source localization data:
a third metric representing direct-to-reverberant ratio information, and
a fourth metric representing direction variance information, wherein the determining of the model output using the first machine learning model is based on the third metric and the fourth metric.

6. The electronic device of claim 1, wherein the model output indicates that a user is engaging with the electronic device.

7. The electronic device of claim 1, wherein the model output indicates that a user is not engaging with the electronic device.

8. The electronic device of claim 1, wherein the first operation comprises turning off a light of the electronic device.

9. The electronic device of claim 1, wherein the model output comprises an engagement value indicating an engagement level and a confidence value indicating a confidence level in the engagement value.

10. The electronic device of claim 1, wherein the first operation comprises sending at least a subset of the first audio data to a remote system, and wherein the one or more computer readable media store further processor executable instructions which, when executed using the one or more processors, cause the electronic device to perform operations comprising:

outputting, using a speaker of the electronic device and based on first response data received from the remote system, audio representing speech responding to user speech.

11. The electronic device of claim 1, wherein the model output indicates that a user is not engaging with the electronic device, and wherein the first operation comprises powering down a component of the electronic device.

12. The electronic device of claim 1, wherein the first operation comprises transitioning to a different state.

13. The electronic device of claim 1, wherein the model output indicates that a user is engaging with the electronic device, and wherein the first operation comprises transitioning to an awake or active state.

14. The electronic device of claim 1, wherein the model output indicates that a user is not engaging with the electronic device, and wherein the first operation comprises transitioning to an inactive or sleep state.

15. The electronic device of claim 1, wherein the model output is a numerical value indicating an engagement level on a scale of engagement.

16. An electronic device comprising:
a plurality of microphones;
a loudspeaker;
one or more processors; and
one or more non-transitory computer readable media storing processor executable instructions which, when executed using the one or more processors, cause the electronic device to perform operations comprising:

determining, based on first audio data corresponding to sound captured by at least two microphones of the plurality of microphones, first sound source localization data indicating, for each respective cell of a plurality of cells:
a respective three-dimensional vector, and
a respective power value associated with the respective three-dimensional vector;

determining, based on the first sound source localization data, a first power value that is a peak power value among the plurality of cells;

determining, based on the first sound source localization data, a mean power value for the plurality of cells;

determining a peak-to-mean ratio value based on the first power value and the mean power value;

determining, using a first machine learning model and based on the peak-to-mean ratio value, model output estimating user engagement; and executing, based on the model output, a first operation.

17. The electronic device of claim 16, wherein the first operation comprises performing speech transcription on at least a portion of the first audio data.

18. The electronic device of claim 16, wherein the first operation comprises generating, based on at least a portion of the first audio data and using a second machine learning model, transcription data.

19. An electronic device comprising:
a plurality of microphones;
a loudspeaker;
one or more processors; and
one or more non-transitory computer readable media storing processor executable instructions which, when executed using the one or more processors, cause the electronic device to perform operations comprising:

determining, based on first audio data corresponding to sound captured by at least two microphones of the plurality of microphones, first sound source localization data indicating, for each respective cell of a plurality of cells:
- a respective three-dimensional vector, and
- a respective power value associated with the respective three-dimensional vector;

determining, based on the first sound source localization data, a power-weighted mean direction vector representing direction variance information;

determining, using a first machine learning model and based on the power-weighted mean direction vector, model output estimating user engagement; and executing, based on the model output, a first operation.

20. The electronic device of claim 19, wherein the first operation comprises performing speech transcription on at least a portion of the first audio data.

\* \* \* \* \*